US012619586B1

(12) United States Patent
Shi et al.

(10) Patent No.: US 12,619,586 B1
(45) Date of Patent: May 5, 2026

(54) HARDWARE IMPLEMENTED DATA LAYER FOR PROCESSING COMPRESSED COLUMNAR DATA

(71) Applicant: Microsoft Technology Licensing, LLC, Redmond, WA (US)

(72) Inventors: Runbin Shi, Austin, TX (US); Conor John Cunningham, Austin, TX (US); Blake Douglas Pelton, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/940,446

(22) Filed: Nov. 7, 2024

(51) Int. Cl.
*G06F 16/22* (2019.01)

(52) U.S. Cl.
CPC .................................. *G06F 16/221* (2019.01)

(58) Field of Classification Search
CPC ...................................................... G06F 16/221
USPC ............................................................ 707/693
See application file for complete search history.

(56) References Cited

U.S. PATENT DOCUMENTS

2021/0182064 A1* 6/2021 Kara .................... G06F 9/30007
2023/0089082 A1* 3/2023 Schreter ................ G06F 16/221
341/51

FOREIGN PATENT DOCUMENTS

JP 2020529064 A * 10/2020 ......... G01R 31/3177

OTHER PUBLICATIONS

"TPC-H Version 2 and Version 3", retrieved from https://www.tpc.org/tpch/, retrieved on Jul. 4, 2025, 3 page.
"What is Arrow?", retrieved from https://arrow.apache.org/, retrieved on Jul. 4, 2025, 1 page.
Peltenburg, et al., "Battling the CPU Bottleneck in Apache Parquet to Arrow Conversion Using FPGA", In International Conference on Field-Programmable Technology (ICFPT), 2020, 7 pages.
Pelton, et al., "Wavefront Threading Enables Effective High-Level Synthesis", In ACM, Jun. 2024, 25 pages.
Extended European Search Report Received for application No. 25210720.6, Jan. 14, 2026, Pages.

* cited by examiner

*Primary Examiner* — Syling Yen

(57) ABSTRACT

An integrated circuit and method are disclosed for processing of compressed columnar data. The processing of compressed columnar data includes loading compressed columnar data associated with a first and a second column into a first on-chip buffer, performing time-shared processing of the compressed columnar data from the first on-chip buffer into a second on-chip buffer, transcoding the compressed columnar data from the second on-chip buffer into unified columnar data having a unified format, loading the unified columnar data into a third on-chip buffer so that the unified columnar data are logically aligned in the third on-chip buffer, and providing at least a portion of the unified columnar data to a query operator. The integrated circuit includes a column loader, a balancer, a transcoder, and a decoder for performing processing of the compressed columnar data.

20 Claims, 8 Drawing Sheets

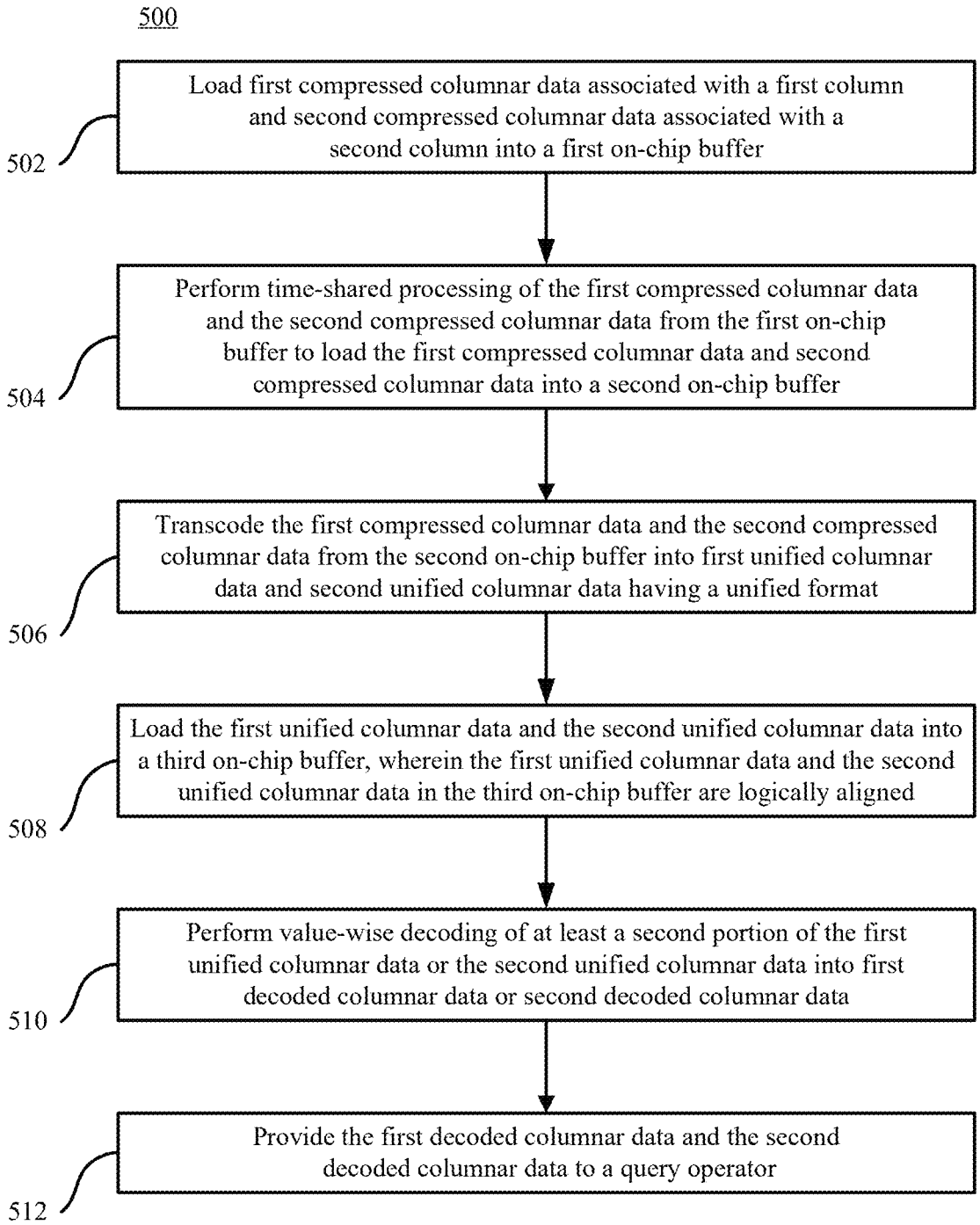

500

502 — Load first compressed columnar data associated with a first column and second compressed columnar data associated with a second column into a first on-chip buffer 504 — Perform time-shared processing of the first compressed columnar data and the second compressed columnar data from the first on-chip buffer to load the first compressed columnar data and second compressed columnar data into a second on-chip buffer 506 — Transcode the first compressed columnar data and the second compressed columnar data from the second on-chip buffer into first unified columnar data and second unified columnar data having a unified format 508 — Load the first unified columnar data and the second unified columnar data into a third on-chip buffer, wherein the first unified columnar data and the second unified columnar data in the third on-chip buffer are logically aligned 510 — Perform value-wise decoding of at least a second portion of the first unified columnar data or the second unified columnar data into first decoded columnar data or second decoded columnar data 512 — Provide the first decoded columnar data and the second decoded columnar data to a query operator

FIG. 5

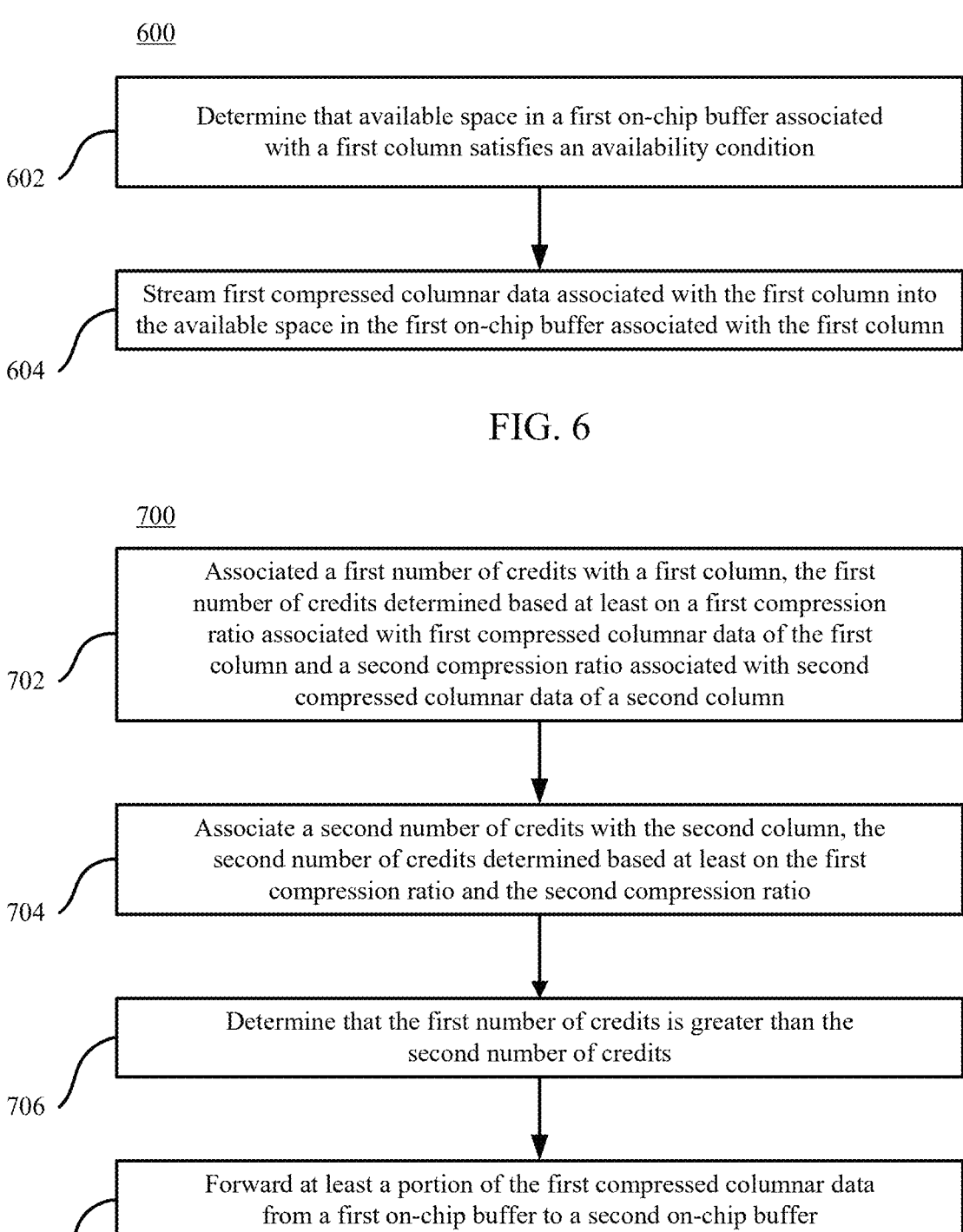

600

602 — Determine that available space in a first on-chip buffer associated with a first column satisfies an availability condition 604 — Stream first compressed columnar data associated with the first column into the available space in the first on-chip buffer associated with the first column

702 — Associated a first number of credits with a first column, the first number of credits determined based at least on a first compression ratio associated with first compressed columnar data of the first column and a second compression ratio associated with second compressed columnar data of a second column 704 — Associate a second number of credits with the second column, the second number of credits determined based at least on the first compression ratio and the second compression ratio 706 — Determine that the first number of credits is greater than the second number of credits 708 — Forward at least a portion of the first compressed columnar data from a first on-chip buffer to a second on-chip buffer 710 — Decrement the first number of credits

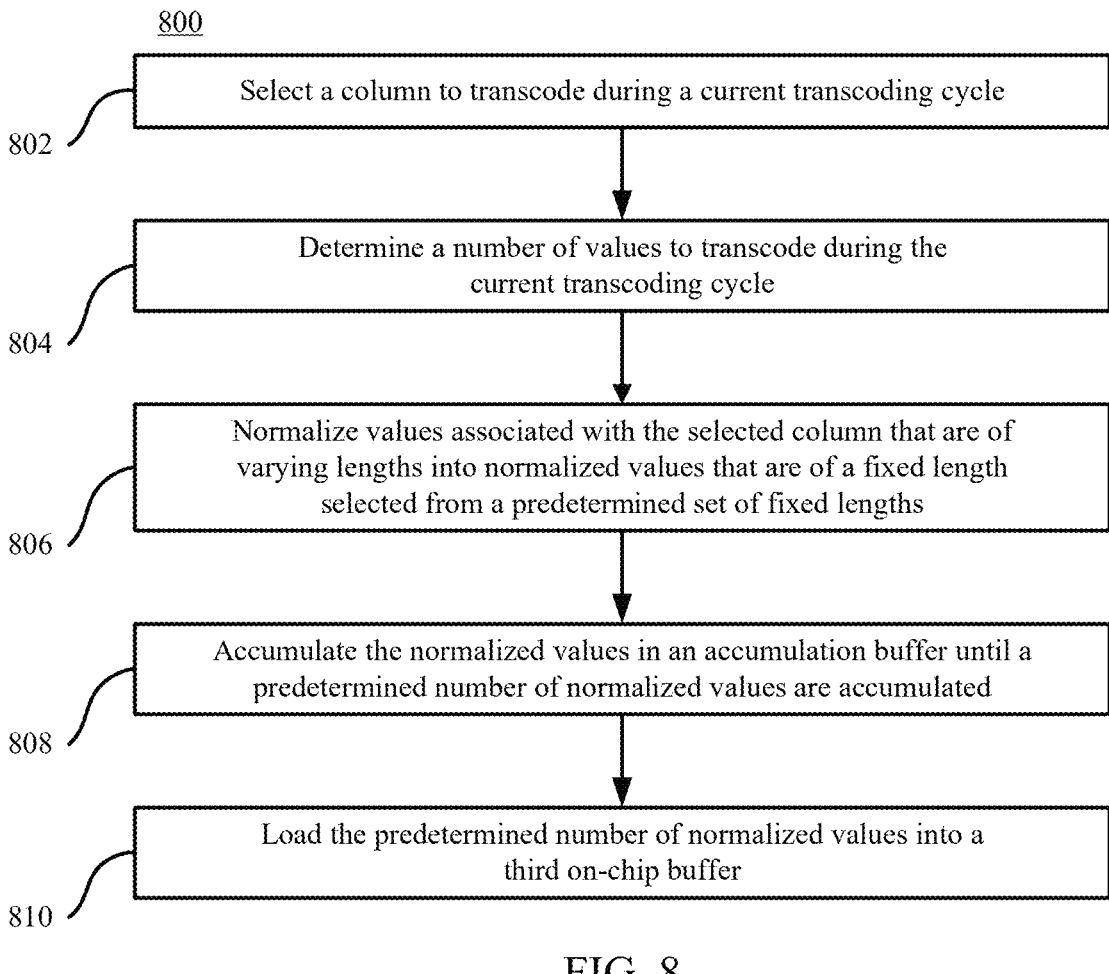

802 — Select a column to transcode during a current transcoding cycle

804 — Determine a number of values to transcode during the current transcoding cycle 806 — Normalize values associated with the selected column that are of varying lengths into normalized values that are of a fixed length selected from a predetermined set of fixed lengths 808 — Accumulate the normalized values in an accumulation buffer until a predetermined number of normalized values are accumulated 810 — Load the predetermined number of normalized values into a third on-chip buffer

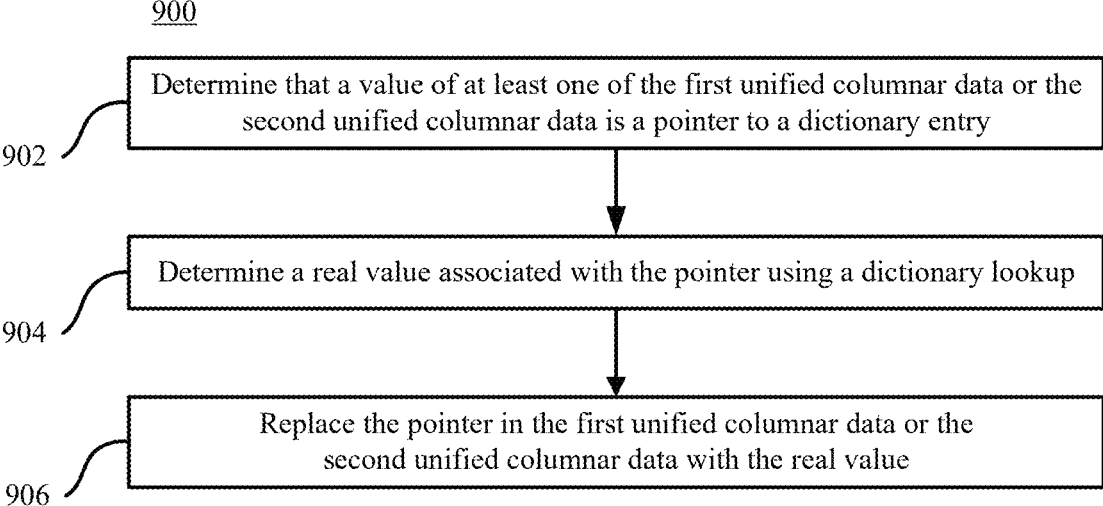

902 — Determine that a value of at least one of the first unified columnar data or the second unified columnar data is a pointer to a dictionary entry 904 — Determine a real value associated with the pointer using a dictionary lookup 906 — Replace the pointer in the first unified columnar data or the second unified columnar data with the real value

FIG. 9

HARDWARE IMPLEMENTED DATA LAYER FOR PROCESSING COMPRESSED COLUMNAR DATA

BACKGROUND

A database is an organized collection of data (e.g., a data store) based on the use of a database management system (DBMS) that enables end users and applications to interact with the data of the database via queries. Columnar storage is a database storage format where data of a database is organized and stored by columns rather than rows. In columnar storage, values of a particular column are stored together in storage (e.g., storage of a computer cluster, which may be local or cloud-based). This approach allows for efficient access to specific columns of a database and enhances query performance for analytical workloads. Columnar storage also allows for better compression relative to row storage because data within a column typically has similar values, often making it more compressible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Hardware-based systems and methods are disclosed for processing of compressed columnar data. Compressed columnar data associated with a plurality of columns are loaded from memory directly to query operators using a hardware-implemented data layer pipeline. The columnar data is loaded from memory in its compressed form and provided to the query operators without converting the compressed columnar data into raw uncompressed columnar data.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 shows a flowchart of an example process for processing compressed columnar data, in accordance with an embodiment.

FIG. 6 depicts a flowchart of an example process for loading compressed columnar data into a first on-chip buffer, in accordance with an embodiment.

FIG. 7 shows a flowchart of an example process for time-shared processing of compressed columnar data from a first on-chip buffer into a second on-chip buffer, in accordance with an embodiment.

FIG. 8 shows a flowchart of an example process for transcoding compressed columnar data into unified compressed columnar data, in accordance with an embodiment.

FIG. 9 shows a flowchart of an example process for value-wise decoding unified compressed columnar data, in accordance with an embodiment.

Figure 1:
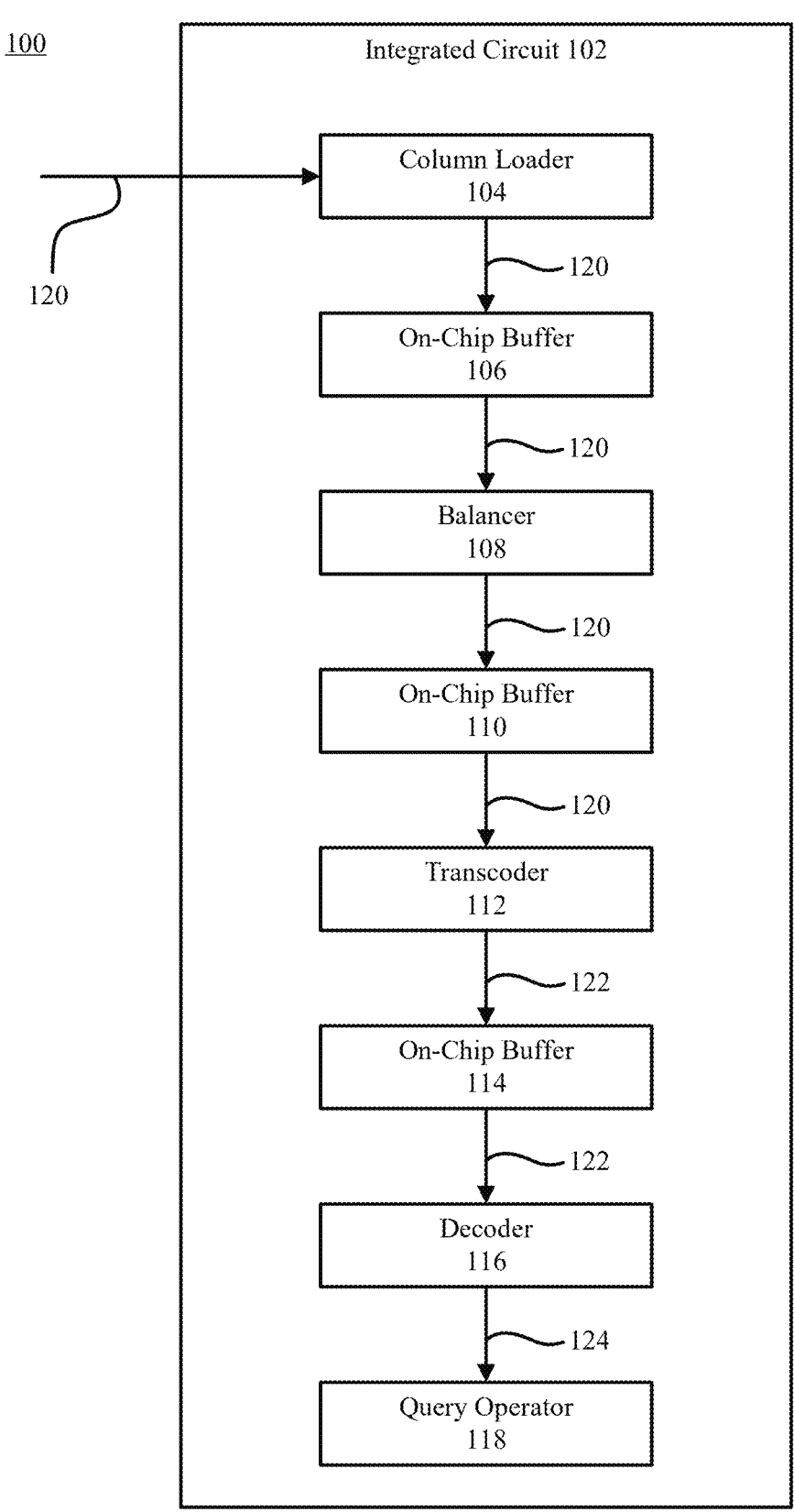
FIG. 1 shows a block diagram of an example system for processing compressed columnar data, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In columnar storage, values of a particular column are stored together. This approach allows for efficient access to specific columns of a database and enhances query performance for analytical workloads. In recent years, query engines have been implemented on new hardware, such as, but not limited to, GPU (Graphical Processing Unit) and/or FPGA (Field-Programmable Gate Array) circuitry/hardware, because microprocessor (e.g., CPU) performance has recently failed to keep up with Moore's Law. In embodiments, columnar data is compressed, e.g., in Parquet format, to further improve the efficiency of storing and processing the columnar data. Accordingly, the query engine typically includes a data layer that fetches the compressed columnar data from memory and feeds it to fast query operators implemented on the new hardware.

Traditional implementations of the data layer have included hardware-based converters that traverse the compressed columnar data and reconstruct the data in an uncompressed format that includes raw column data. These implementations result in memory inefficiencies because the uncompressed columnar data may need to be stored in memory (e.g., dynamic random access memory (DRAM)) which requires vast memory bandwidth and/or raw data buffering. Additionally, such implementations may also result in a loss of processing efficiencies because fast query operators that are capable of directly operating on compressed (e.g., run-length encoded) columnar data may not operate on raw uncompressed columnar data with the same efficiency.

Embodiments disclosed herein are directed to a hardware-implemented data layer that loads compressed columnar data and provides the compressed columnar data to hardware-implemented query operators without converting the compressed columnar data to raw uncompressed columnar data. In embodiments, the hardware-implemented data layer reads compressed columnar data associated with multiple columns concurrently from memory (e.g., DRAM) and streams the compressed columnar data to on-chip query operators without buffering the compressed columnar data in memory. In embodiments, the hardware-implemented data layer allows line-rate processing of compressed columnar data by fully utilizing a high-bandwidth bus interface, such as, but not limited to, a DRAM and/or a PCIe interface.

In embodiments, compressed columnar data is stored in various formats, such as, but not limited to, Vertipaq and/or Parquet format. In embodiments, columns are divided into column segments that are encoded into a run-length encoded (RLE) array and a Bitpack array. In embodiments, the values in the RLE array are encoded using tuples that include a length and a value. For instance, when the number of consecutive rows of a column that share a common row value exceeds a predetermined threshold (e.g., N consecutive rows), the consecutive rows that share the common row value are encoded in the RLE array using a single uniform block tuple that includes a length indicative of the number consecutive rows that share the common row value, and a value indicative of the common row value shared by the consecutive rows. In embodiments, the predetermined threshold (e.g., N consecutive rows) is selected to ensure that the storage benefits outweigh the overhead costs associated with run-length encoding. In embodiments, the value of the uniform block tuple is of a fixed bit width (e.g., 32 bits, 64 bits, etc.). When the number of consecutive rows of a column that share a common row value does not exceed the predetermined threshold, in embodiments, these rows are encoded in the RLE array using a nonuniform block tuple that includes a length indicative of the number consecutive rows of the column that do not share the common value, and a pointer to a position in the Bitpack array that includes the first row value of the rows represented by the nonuniform block tuple. In embodiments, values in the Bitpack array are compressed to a minimal bit width that can represent the value range of the rows. In embodiments, the nonuniform block tuple encodes rows in the column that are not encoded using uniform block tuples.

In embodiments, the query engine performs row-wise operations and accesses multiple columns concurrently. When the columnar data is compressed, the amount of physical data that needs to be loaded by the query engine to keep the columns logically aligned may, in embodiments, differ from column to column. For instance, when columnar data is compressed using RLE, the compression ratio of the compressed columnar data may, in embodiments, differ between columns depending on the number of consecutive rows of the columns that share the same common row value. Accordingly, the physical memory footprint of compressed columnar data of different columns may, in embodiments, correspond to different logical column lengths (i.e., different number of rows of the column). In embodiments disclosed herein, the hardware-implemented data layer loads compressed columnar data in its compressed format and logically aligns the loaded compressed columnar data based on a compression ratio associated with the compressed columnar data prior to providing the logically-aligned compressed columnar data to on-chip query operators. In embodiments, logically aligning the compressed columnar data enables the query operators to quickly process the compressed columnar data and reduces the amount of time the compressed columnar data remains in on-chip memory.

In embodiments, the hardware-implemented data layer is implemented using one or more virtual column interface (VCI) instantiations that are programmable during runtime based on logical column properties, such as, but not limited to, the number of columns, a column index mapping, and/or the like. For instance, the data layer, in embodiments, can be implemented using a plurality of VCI instantiations that are programmed during runtime to support concurrent processing of a variable number of columns. In embodiments, a fixed amount of on-chip storage is dedicated to the VCI instantiations. In embodiments, the VCI instantiations also acts as an interface between the hardware-implemented data layer and the query operators, and/or between a plurality of query operators. In embodiments, the data layer loads the compressed columnar data from off-chip memory (e.g., FPGA off-chip DRAM, CPU DRAM, etc.) over a physical memory interface (e.g., PCIe DMA interface, etc.) and streams the compressed columnar data to on-chip query operators. In embodiments, the hardware-implemented data layer maximizes the physical memory interface to achieve line-rate processing of the compressed columnar data. For instance, by loading the compressed columnar data from memory (e.g., DRAM, etc.) without decompressing the data, the physical memory interface can be fully utilized to read the compressed columnar data.

In embodiments, the compressed columnar data is processed by the data layer via one or more functional modules that include, for example, but not limited to, a column loader, a balancer, a transcoder, and/or a decoder. In embodiments, the columnar data is buffered in on-chip memory (e.g., SRAM, etc.) in between the functional modules without consuming any DRAM bandwidth. For instance, on-chip buffers interconnect the functional modules and enable the functional modules to work on columns individually. To reduce the cost of buffering the columnar data in the on-chip buffers, the data layer, in embodiments, keeps the loaded columnar data logically aligned so that the data can be quickly processed by query operators.

In embodiments, on-chip buffers interconnecting the functional modules of the data layer include a pair of stream I/O (Input/Output) that connect the on-chip buffer to a data producer and a data consumer. In embodiments, the on-chip buffers are logically divided into column spaces corresponding to the columns being processed concurrently, and the column spaces share the same on-chip memory (e.g., SRAM, block RAM, BRAM, etc.) that provides a pair of data I/O ports for concurrent read and write in order to improve the processing speed. In embodiments, on-chip buffers process a fixed-width payload every clock cycle that is referred to herein as a "flit." In embodiments, the bit width of a flit may differ depending on the payload type. For instance, at the beginning stages of the data layer pipeline, a flit of a RLE payload array and/or a Bitpack array has a first bit width (e.g., 512 bits, etc.), while at later stages of the data layer pipeline, a payload encoded in a unified RLE format includes a value flit having a second bit width (e.g., 512 bits, etc.) and a length flit having a third bit width (e.g., 1344 bits, etc.).

In embodiments, the column loader loads compressed columnar data associated with multiple columns by streaming, in a round-robin manner, compressed columnar data of the multiple columns into available logical space in a first on-chip buffer corresponding to the columns. For instance, the column loader periodically checks the available logical space in the first on-chip buffer associated with the columns, and when the available logical space in the first on-chip buffer associated with a particular column exceeds a predetermined threshold (e.g., 32 flits, etc.), the column loader burst reads compressed columnar data associated with the particular column into the available logical space in the first on-chip buffer associated with the particular column. By ensuring that there is sufficient available logical space in the first on-chip buffer, the column loader can, in embodiments, take full advantage of burst read rates and achieve line-rate processing.

In embodiments, the column loader loads the compressed columnar data by performing interleaved reads from the RLE array and the Bitpack array in order to maintain the logical row order of the columnar data. For instance, when reading compressed columnar data associated with a column, the column loader loads values from the RLE array into an RLE FIFO (first-in-first-out) associated with the column, and, when the column loader encounters a nonuniform block tuple, the column loader loads the number of values from the Bitpack array indicated by the length field of the nonuniform block tuple starting from the position in the Bitpack array indicated by the pointer of the nonuniform block tuple into a Bitpack FIFO associated with the column. By interleaving reads of values from the RLE array and the Bitpack array, the column loader, in embodiments, maintains the logical order of the rows associated with the column. In embodiments, the compressed columnar data is buffered in the first on-chip buffer until it is processed by the balancer in the next stage of the processing pipeline.

In embodiments, the balancer processes the compressed columnar data in the first on-chip buffer in a time-shared manner in order to ensure that the compressed columnar data of the multiple columns is logically aligned in a second on-chip buffer. During each clock cycle, the balancer, in embodiments, selects an RLE flit or a Bitpack flit of a column for forwarding from the first on-chip buffer to the second on-chip buffer. In embodiments, a column may be in an RLE forwarding mode or a Bitpack forwarding mode depending on the content of the RLE flit. For instance, if a current RLE flit of a column includes at least one nonuniform block tuple, the column is set to a Bitpack forwarding mode where only Bitpack flits associated with the column are forwarded from the first on-chip buffer to the second on-chip buffer until the Bitpack values associated with the nonuniform block tuples of the current RLE flit are forwarded to the second on-chip buffer.

In embodiments, a column is set to an RLE forwarding mode when the column is not in Bitpack forwarding mode and the transcoder is not currently transcoding an RLE tuple associated with the column. When a column is set to an RLE forwarding mode, the balancer, in embodiments, selects an RLE flit associated with the column for RLE flit forwarding from the first on-chip buffer to the second on-chip buffer.

In embodiments, the balancer performs Bitpack flit forwarding based on credit-based forwarding system. For instance, the balancer initializes columns that are in Bitpack forwarding mode with a number of credits based on the relative compression ratios (e.g., values per flit, etc.) of the Bitpack flits associate with the column, selects a column with the highest number of credits for Bitpack flit forwarding, and decrements the number of credits for the selected column after a Bitpack flit associated with the column is forwarded to the second on-chip buffer. By selecting the eligible column with the highest number of credits, the balancer, in embodiments, logically aligns the compressed columnar data associated with the columns. In embodiments, the balancer performs Bitpack flit forwarding in a round-robin manner until the number of credits for the columns are depleted and then reinitializes the columns that are in Bitpack forwarding mode with a number of credits based on the relative compression ratios of the Bitpack flits associate with the columns.

In embodiments, the transcoder transcodes compressed columnar data in the second on-chip buffer in a round-robin manner. For instance, in every clock cycle a controller of the transcoder selects an eligible column to transcode during the clock cycle and a number of RLE or Bitpack values associated with the selected column to transcode during the clock cycle. In embodiments, a column is eligible Bitpack transcoding if there is leftover Bitpack values to transcode in a current nonuniform block and a Bitpack flit is available for transcoding. In embodiments, a column is eligible for RLE transcoding if the column is not eligible for Bitpack transcoding and there is an RLE tuple that can be transcoded in a current RLE flit. During subsequent clock cycles, the controller selects the next eligible column to transcode based on a column identifier associated with the column that was transcoded during the previous clock cycle.

During RLE transcoding, one RLE tuple is appended per clock cycle to a unified RLE stream associated with the column. During Bitpack transcoding, up to one Bitpack flit per clock cycle is appended to the unified RLE stream associated with the column. For instance, when the entire Bitpack flit is in the middle of a nonuniform block, values of the entire Bitpack flit are appended to the RLE stream during the current clock cycle. However, when a nonuniform block end in the middle of a Bitpack flit, the leftover values of the nonuniform block are appended to the unified RLE stream associated with the column.

In embodiments, an aligner processes the unified RLE streams associated with the columns by padding the unified values to normalize unified values to a fixed bit width selected from a set of predetermined fixed bit widths (e.g., 8 bits, 16 bits, 32 bits, etc.). In embodiments the fixed bit width is selected based on the bit width of the RLE or Bitpack values of the column in order provide enough bit width to store the compressed values while keeping the unified. In embodiments, the set of fixed bit widths is determined before running a workload based on a Bitpack value width obtained from row group metadata. In embodiments, the normalized values are accumulated in accumulation buffers associated with the columns until the number of tuples in the accumulation buffers exceeds a unified RLE flit of a fixed size. When the number of tuples accumulated in an accumulation buffer associated with a column exceeds the fixed size of a unified RLE flit, a unified RLE flit is output to a column space in a third on-chip buffer associated with the column. In embodiments, the accumulation buffers enable the transcoder to fully utilize the I/O throughput available during each clock cycle to improve processing speeds. In embodiments, the unified RLE flit is output on a data interface that is shared by columns normalized to different bit widths.

In embodiments, a decoder decodes the normalized RLE or Bitpack values in the third on-chip buffer by performing value-wise decoding using dictionary lookups. For instance, the decoder determines that a normalized RLE or Bitpack values includes a pointer to a dictionary, performs a dictionary lookup using the pointer to determine an actual (i.e., raw) value, and replaces the pointer with the actual value. In embodiments, the dictionary is preloaded into on-chip memory for use by the decoder. In embodiments, the dictionary is duplicated to a plurality of on-chip buffers to enable high-throughput and/or low-latency dictionary lookups. In embodiments, the decoder provides the decoded RLE or Bitpack values to a query operator for query processing. In embodiments, the decoded RLE or Bitpack values are provided to a query operator of a set of query operators based on the fixed bit width of the RLE or Bitpack values. For instance, RLE or Bitpack values having a first bit width (e.g., 8 bits, etc.) are provided to a first query operator, while RLE or Bitpack values having a second bit width (e.g., 16 bits, etc.) are provided to a second query operator. In embodiments, providing Bitpack values having a particular bit width to a particular query provider especially configured to process values having the particular bit width enables the query providers more quickly process the values.

These and further embodiments enable the functionality described above and additional functionality. Such embodiments are described in further detail as follows.

For example, FIG. 1 shows a block diagram of an example system 100 for processing compressed columnar data, in accordance with an embodiment. As shown in FIG. 1, system 100 includes an integrated circuit 102 comprising a column loader 104, a first on-chip buffer 106, a balancer 108, a second on-chip buffer 110, a transcoder 112, a third on-chip buffer 114, a decoder 116, and a query operator 118. System 100 is described in further detail as follows.

Integrated circuit 102 comprises any circuit device capable of performing the functions ascribed thereto in the following description, as will be appreciated by persons skilled in the relevant art(s), including those mentioned elsewhere herein or otherwise known. In embodiments, integrated circuit 102 comprises various subcomponents (not shown), such as, but not limited to, logic blocks, interconnects that connect the logic blocks, I/O blocks, and/or block RAM. In embodiments, integrated circuit 102 is implemented using, for example, but not limited to, a field-programmable gate array (FPGA), an application-specific integrated circuit (ASIC), and/or the like.

Column loader 104 is configured to load compressed columnar data 120 associated with multiple columns by streaming, in a round-robin manner, compressed columnar data 120 of the multiple columns into available logical space in on-chip buffer 106 corresponding to the columns. For instance, column loader 104 periodically checks the available logical space in on-chip buffer 106 associated with the columns, and when the available logical space in on-chip buffer 106 associated with a particular column exceeds a predetermined threshold (e.g., 32 flits, etc.), column loader 104 burst reads compressed columnar data 120 associated with the particular column into the available space in on-chip buffer 106 associated with the particular column. In embodiments, column loader 104 loads compressed columnar data 120 by performing interleaved reads from an RLE array and a Bitpack array associated with the column in order to maintain the logical row order of the columnar data. For instance, when reading compressed columnar data 120 associated with a column, column loader 104 loads values from the RLE array into an RLE FIFO associated with the column, and, when column loader 104 encounters a non-uniform block tuple, column loader 104 loads the number of values from the Bitpack array indicated by the length field of the nonuniform block tuple starting from the position in the Bitpack array indicated by the pointer of the nonuniform block tuple into a Bitpack FIFO associated with the column.

On-chip buffer 106 is configured to buffer compressed columnar data 120 until it is processed by balancer 108. On-chip buffer 106 will be described in greater detail below in conjunction with FIG. 2.

Balancer 108 is configured to process compressed columnar data 120 in on-chip buffer 106 in a time-shared manner in order to ensure that compressed columnar data 120 of the multiple columns is logically aligned in on-chip buffer 110. During each clock cycle, balancer 108, in embodiments, selects an RLE flit or a Bitpack flit of a column for forwarding from on-chip buffer 106 to on-chip buffer 110. In embodiments, balancer 108 performs Bitpack flit forwarding based on credit-based forwarding system. For instance, balancer 108 initializes columns that are in a Bitpack forwarding mode with a number of credits based on the relative compression ratios (e.g., values per flit, etc.) of the Bitpack flits associate with the column, selects a column with the highest number of credits for Bitpack flit forwarding, and decrements the number of credits for the selected column after a Bitpack flit associated with the column is forwarded to the second on-chip buffer. In embodiments, balancer 108 performs Bitpack flit forwarding in a round-robin manner until the number of credits for the columns are depleted and then reinitializes the columns that are in Bitpack forwarding mode with a number of credits based on the relative compression ratios of the Bitpack flits associate with the columns.

On-chip buffer 110 is configured to buffer compressed columnar data 120 until it is processed by transcoder 112. On-chip buffer 110 will be described in greater detail below in conjunction with FIG. 3.

Transcoder 112 is configured to transcode compressed columnar data 120 from on-chip buffer 110 into unified compressed columnar data 122 in a round-robin manner. For instance, the transcoder normalizes the RLE and/or Bitpack values that are of arbitrary bit widths into a unified stream of values having one of a predetermined number of bit widths (e.g., 8 bits, 16 bits, 32 bits, etc.), and that maintains the logical row order of the RLE and/or Bitpack values in the column. In embodiments, in every clock cycle a controller of transcoder 112 selects an eligible column to transcode during the clock cycle and a number of RLE or Bitpack values to transcode during the clock cycle. During subsequent clock cycles, the controller selects the next eligible column to transcode based on a column identifier associated with the column that was transcoded during the previous clock cycle. Transcoder 112 will be described in greater detail below in conjunction with FIG. 4.

On-chip buffer 114 is configured to buffer unified compressed columnar data 122 until it is processed by decoder 116. On-chip buffer 114 will be described in greater detail below in conjunction with FIG. 4.

Decoder 116 is configured to decode unified compressed columnar data 122 from on-chip buffer 114 by performing value-wise decoding using dictionary lookups to generate decoded unified compressed columnar data 124. For instance, decoder 116 determines that a normalized RLE or Bitpack values in unified compressed columnar data 122 includes a pointer to a dictionary, performs a dictionary lookup using the pointer to determine an actual (i.e., raw) value, and replaces the pointer with the actual value. In embodiments, decoder 116 provides decoded unified compressed columnar data 124 to query operator 118 for query processing.

Query operator 118 is configured to process decoded unified compressed columnar data 124 in row-major. In embodiments, decoded unified compressed columnar data 124 is provided to query operator 118 based on the fixed bit width of the RLE or Bitpack values of decoded unified compressed columnar data 124. For instance, RLE or Bitpack values having a first bit width (e.g., 8 bits, etc.) are provided to a first query operator 118, while RLE or Bitpack values having a second bit width (e.g., 16 bits, etc.) are provided to a second query operator 118.

Figure 2:
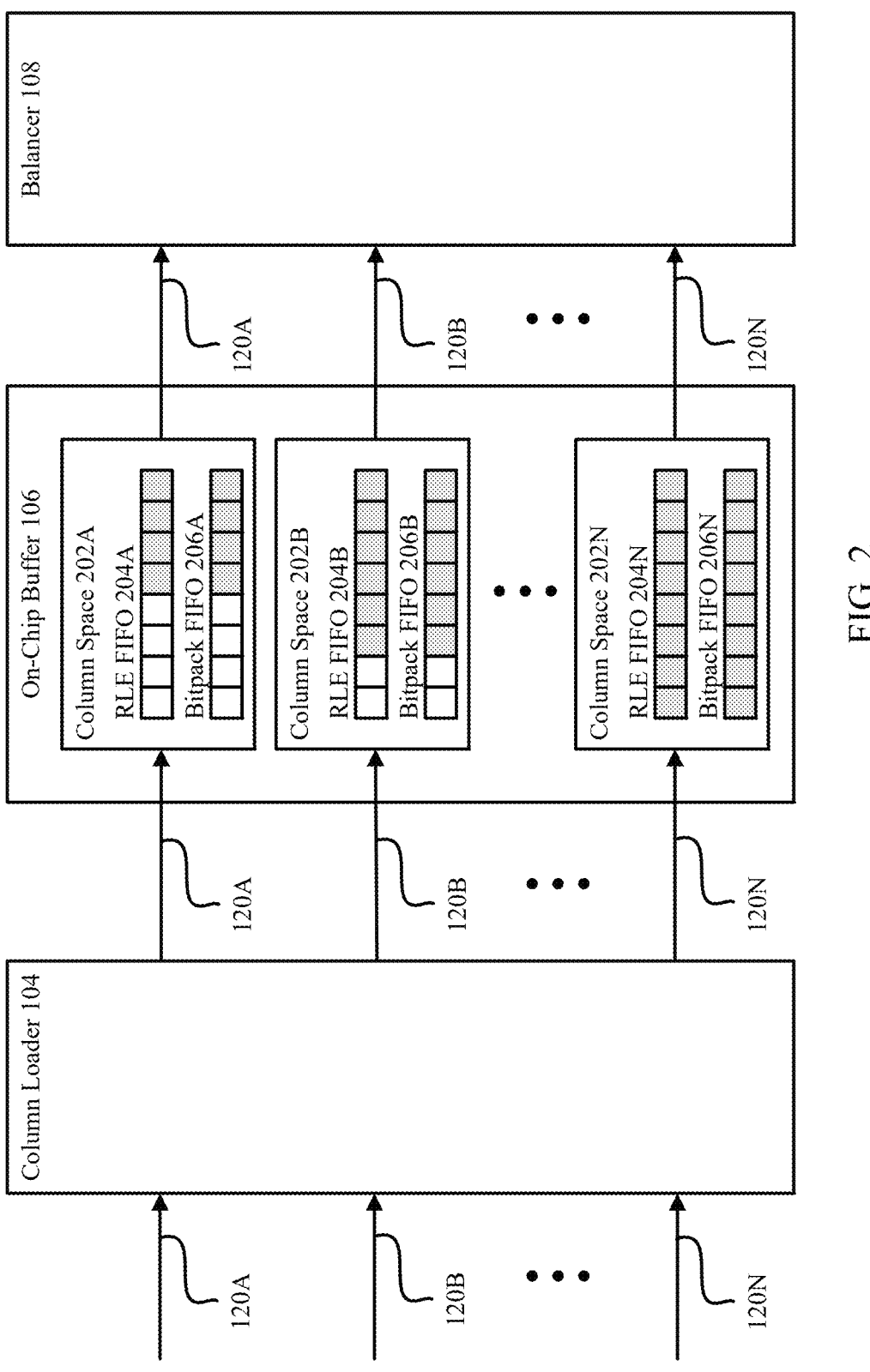
FIG. 2 shows a block diagram of an example system for loading compressed columnar data into a first on-chip buffer, in accordance with an embodiment.

Embodiments described herein may operate in various ways to load compressed columnar data into a first on-chip buffer. For instance, FIG. 2 shows a block diagram of an example system 200 for loading compressed columnar data into a first on-chip buffer, in accordance with an embodiment. As shown in FIG. 2, system 200 comprises column loader 104, on-chip buffer 106, and balancer 108. Further, on-chip buffer 106 comprises one or more column spaces 202A-202N that respectively comprise one or more RLE FIFOs 204A-204N and Bitpack FIFOs 206A-206N. System 200 is described in further detail as follows.

Column space(s) 202A-202N comprise logical subspace (s) of on-chip buffer 106 that correspond to a particular column. In embodiments, compressed columnar data 120A-120N are buffered in shared FIFO space accessible via a pair of I/O data interfaces in time-shared manner. In embodiments, column space(s) 202A-202N buffer compressed columnar data 120A-120N associated with the corresponding columns until it is processed by balancer 108.

RLE FIFO(s) 204A-204N comprise FIFO data structures that buffer RLE tuples associated with a corresponding column until it is processed by balancer 108. In embodiments, RLE tuples processed by balancer 108 are forwarded from RLE FIFO(s) 204A-204N to corresponding RLE FIFOs in on-chip buffer 110.

Bitpack FIFO(s) 206A-206N comprise FIFO data structures that buffer Bitpack values associated with a corresponding column until it is processed by balancer 108. In embodiments, Bitpack values processed by balancer 108 are forwarded from Bitpack FIFO(s) 206A-206N to corresponding Bitpack FIFOs in on-chip buffer 110.

Figure 3:
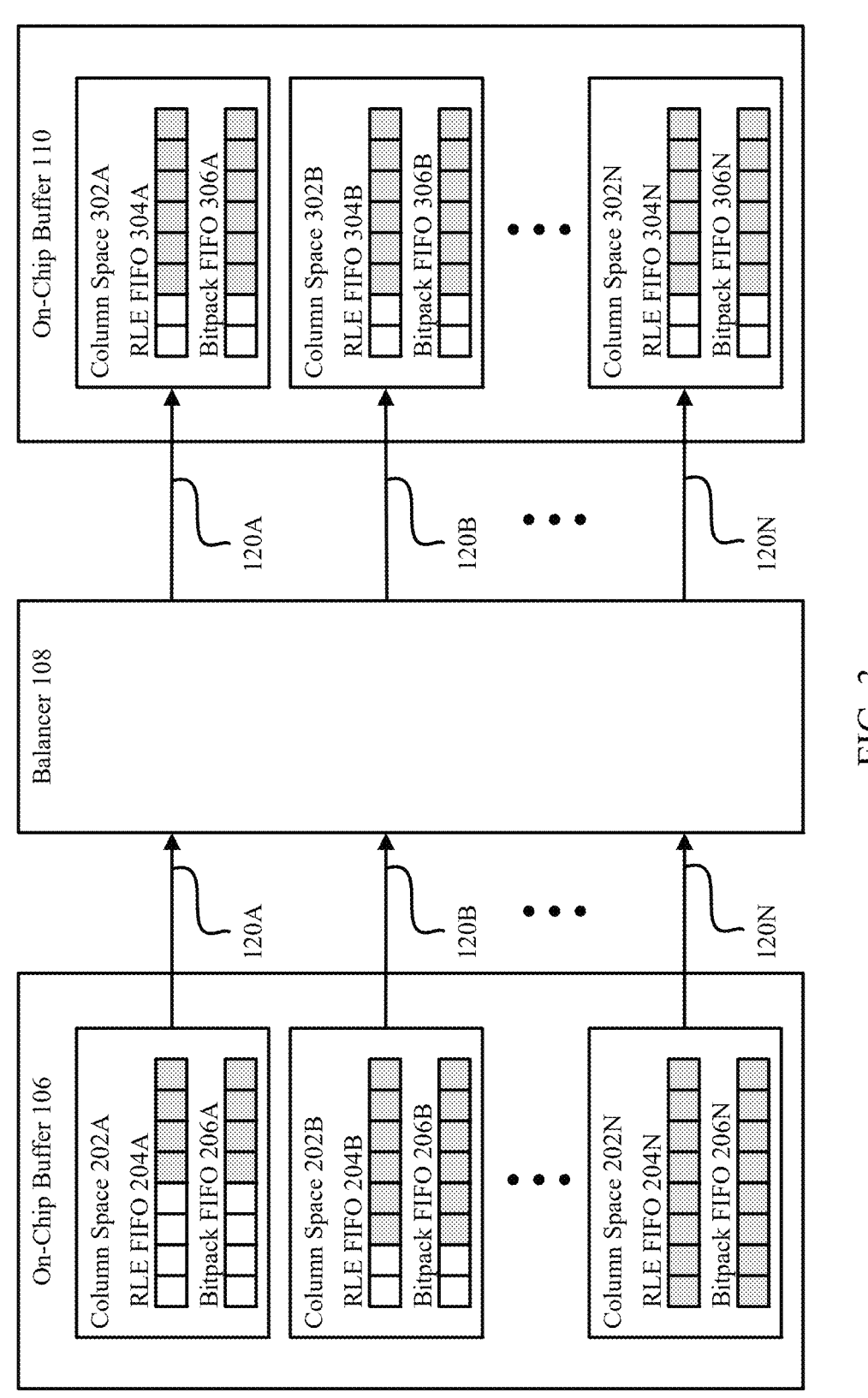
FIG. 3 shows a block diagram of an example system for time-shared processing of compressed columnar data from a first on-chip buffer into a second on-chip buffer, in accordance with an embodiment.

Embodiments described herein may operate in various ways to process compressed columnar data from a first on-chip buffer into a second on-chip buffer in a time-shared manner. For instance, FIG. 3 shows a block diagram of an example system 300 for time-shared processing of compressed columnar data from a first on-chip buffer into a second on-chip buffer, in accordance with an embodiment. As shown in FIG. 3, system 300 comprises on-chip buffer 106, balancer 108, and on-chip buffer 110. On-chip buffer 110 further comprises one or more column spaces 302A-302N that respectively comprise one or more RLE FIFOs 304A-304N and Bitpack FIFOs 306A-306N. System 300 is described in further detail as follows.

Column space(s) 302A-302N comprise logical subspace (s) of on-chip buffer 106 that correspond to a particular column. In embodiments, column space(s) 202A-202N buffer compressed columnar data 120A-120N associated with the corresponding columns until it is processed by transcoder 112.

RLE FIFO(s) 304A-304N comprise FIFO data structures that buffer RLE tuples associated with a corresponding column until it is processed by transcoder 112. In embodiments, RLE tuples processed by balancer 108 from RLE FIFO(s) 204A-204N are buffered in RLE FIFO(s) 304A-304N.

Bitpack FIFO(s) 306A-306N comprise FIFO data structures that buffer Bitpack values associated with a corresponding column until it is processed by transcoder 112. In embodiments, Bitpack values processed by balancer 108 from Bitpack FIFO(s) 206A-206N are buffered in Bitpack FIFO(s) 306A-306N.

Figure 4:
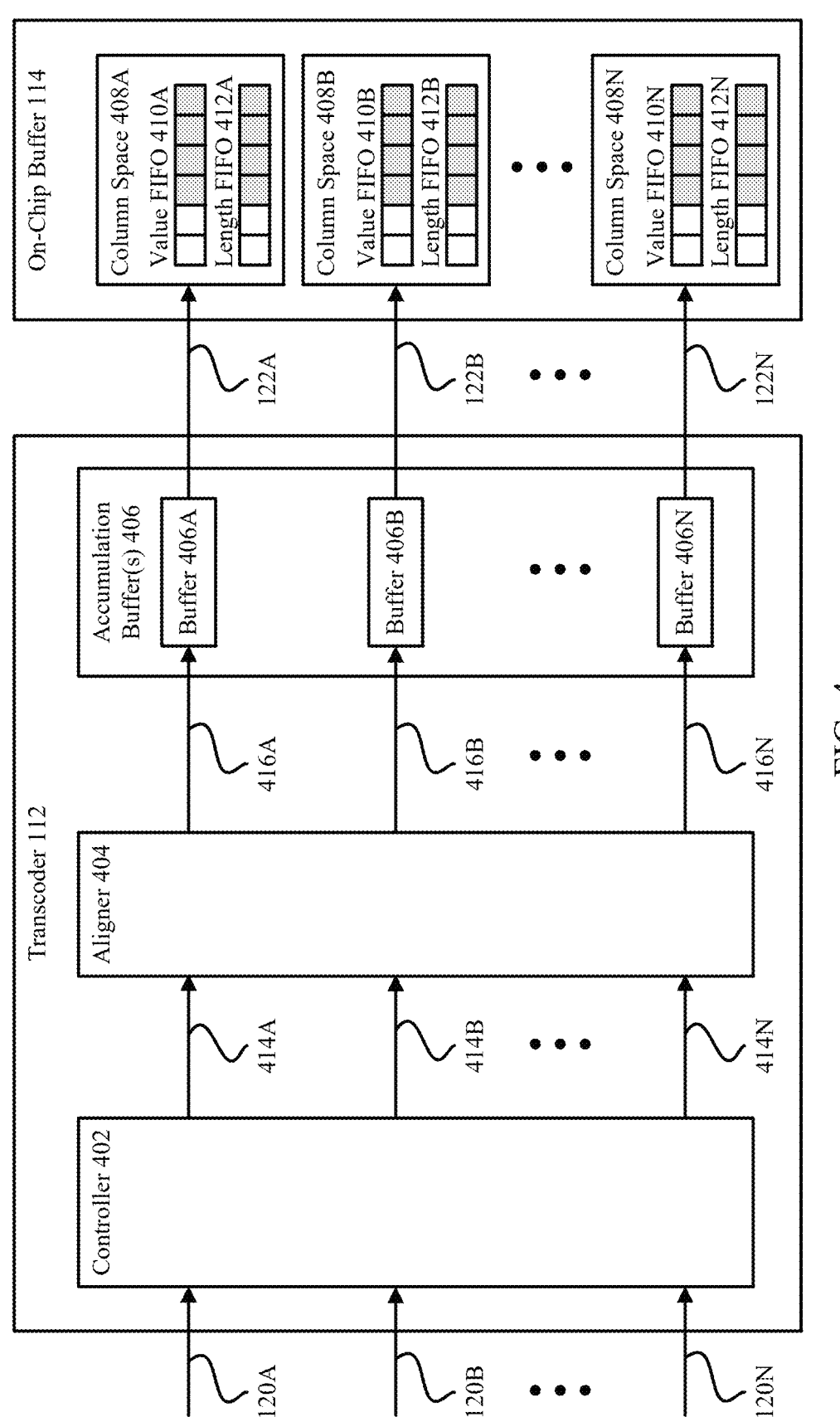
FIG. 4 shows a block diagram of an example system for transcoding compressed columnar data into unified compressed columnar data, in accordance with an embodiment.

Embodiments described herein may operate in various ways to transcode compressed columnar data into unified compressed columnar data FIG. 4 shows a block diagram of an example system 400 for transcoding compressed columnar data into unified compressed columnar data, in accordance with an embodiment. As shown in FIG. 4, system 400 comprises transcoder 112 and on-chip buffer 114. Further, transcoder 112 comprises a controller 402, an aligner 404, and one or more accumulation buffers 406A-406N, and on-chip buffer 114 comprises one or more column spaces 408A-408N that respectively comprise one or more Value FIFOs 410A-410N and Length FIFOs 412A-412N. System 400 is described in further detail as follows.

Controller 402 is configured to select an eligible column to transcode during the clock cycle and a number of RLE or Bitpack values associated with the selected column to transcode during the clock cycle. During subsequent clock cycles, the controller selects the next eligible column to transcode based on a column identifier associated with the column that was transcoded during the previous clock cycle. During each clock cycle, controller 402, in embodiments, appends, onto unified RLE streams 414A-414N associated with the selected column, an RLE tuple from RLE FIFO(s) 304A-304N associated with the selected column or up to a Bitpack flit of values from Bitpack FIFO(s) 306A-306N associated with the selected column.

Aligner 404 is configured to process unified RLE streams 414A-414N associated with the columns by padding the RLE or Bitpack values to normalize the RLE or Bitpack values to a fixed bit width selected from a set of predetermined fixed bit widths (e.g., 8 bits, 16 bits, 32 bits, etc.). In embodiments, aligner 404 provides normalized columnar data 416A-416N to accumulation buffer(s) 406A-406N associated with the columns Accumulation buffer(s) 406A-406N are configured to accumulate normalized columnar data 416A-416N until the number of tuples in accumulation buffer(s) 406A-406N exceeds a unified RLE flit of a fixed size. When the number of tuples accumulated in accumulation buffer(s) 406A-406N associated with a column exceeds the fixed size of a unified RLE flit, a unified RLE flit is output to a column space in on-chip buffer 114 associated with the column.

Column space(s) 408A-408N comprise logical subspace (s) of on-chip buffer 114 that correspond to a particular column. In embodiments, column space(s) 408A-408N buffer unified compressed columnar data 122A-122N associated with the corresponding columns until it is processed by decoded 116.

Value FIFO(s) 410A-410N comprise FIFO data structures that buffer normalized RLE or Bitpack associated with a corresponding column until it is processed by decoder 116.

Length FIFO(s) 412A-412N comprise FIFO data structures that buffer length values corresponding to the normalized RLE or Bitpack values buffered in Value FIFO(s) 410A-410N.

Embodiments described herein may operate in various ways to process compressed columnar data. For instance, FIG. 5 depicts a flowchart 500 of a process for processing compressed columnar data, in accordance with an embodiment. Integrated circuit 102, column loader 104, on-chip buffer 106, balancer 108, on-chip buffer 110, transcoder 112, on-chip buffer 114, and/or decoder 116 may, for example, operate according to flowchart 500. Note that not all steps of flowchart 500 need to be performed in all embodiments, and in some embodiments, the steps of flowchart 500 may be performed in different orders than shown. Flowchart 500 is described as follows with respect to FIG. 1 for illustrative purposes.

Flowchart 500 starts at step 502. In step 502, first compressed columnar data associated with a first column and second compressed columnar data associated with a second column are loaded into a first on-chip buffer. For example, column loader 104 loads compressed columnar data 120A-120N into column space(s) 202A-202N in on-chip buffer 106. In embodiments, column loader 104 loads compressed columnar data 120A-120N by performing interleaved reads from RLE arrays and/or Bitpack arrays associated with the column in order to maintain the logical row order of the columnar data. For instance, when reading compressed columnar data 120A-120N associated with a column, column loader 104 loads values from the RLE array associated with the columns into RLE FIFO(s) 204A-204N, and, when column loader 104 encounters a nonuniform block tuple, column loader 104 loads the number of values from the Bitpack arrays indicated by the length field of the nonuniform block tuple starting from the position in the Bitpack arrays indicated by the pointer of the nonuniform block tuple into Bitpack FIFO(s) 206A-206N.

In step 504, time-shared processing is performed on the first compressed columnar data and the second compressed columnar data and the processed first compressed columnar data to load the first compressed columnar data and the second compressed columnar data into a second on-chip buffer. For example, balancer 108 performs time-shared processing of compressed columnar data 120A-120N from RLE FIFO(s) 204A-204N and/or Bitpack FIFO(s) 206A-206N of column space(s) 202A-202N in on-chip buffer 106 into RLE FIFO(s) 304A-304N and/or Bitpack FIFO(s) 306A-306N of column space(s) 302A-302N in on-chip buffer 110. In embodiments, balancer 108 performs Bitpack flit forwarding based on credit-based forwarding system. For instance, balancer 108 initializes columns that are in a Bitpack forwarding mode with a number of credits based on the relative compression ratios (e.g., values per flit, etc.) of the Bitpack flits associate with the column, selects a column with the highest number of credits for Bitpack flit forwarding, and decrements the number of credits for the selected column after a Bitpack flit associated with the column is forwarded to the second on-chip buffer. In embodiments, balancer 108 performs Bitpack flit forwarding in a round-robin manner until the number of credits for the columns are depleted and then reinitializes the columns that are in Bitpack forwarding mode with a number of credits based on the relative compression ratios of the Bitpack flits associate with the columns.

In step 506, the first compressed columnar data and the second compressed columnar data from the second on-chip buffer are respectively transcoded into first unified columnar data and second unified columnar data having a unified format. For example, transcoder 112 transcodes compressed columnar data 120A-120N from RLE FIFO(s) 304A-304N and/or Bitpack FIFO(s) 306A-306N of column space(s) 302A-302N in on-chip buffer 110 into unified compressed columnar data 122A-122N.

In step 508, the first unified columnar data and the second unified columnar data are loaded into a third on-chip buffer, where the first unified columnar data and the second unified columnar data are logically aligned in the third on-chip buffer. For example, transcoder 112 loads unified compressed columnar data 122A-122N into value FIFO(s) 410A-410N and/or length FIFO(s) 412A-412N of column space(s) 408A-408N in on-chip buffer 114.

In step 510, at least a second portion of the first unified columnar data or the second unified columnar data is value-wise decoded into first decoded columnar data or second decoded columnar data. For example, decoder 116 performs value-wise decoding of unified compressed columnar data 122A-122N from value FIFO(s) 410A-410N of column space(s) 408A-408N in on-chip buffer 114 to generate decoded unified compressed columnar data 124. For instance, decoder 116 determines that a normalized RLE or Bitpack values in unified columnar data 122 includes a pointer to a dictionary, performs a dictionary lookup using the pointer to determine an actual (i.e., raw) value, and replaces the pointer with the actual value. In embodiments, decoder 116 provides decoded unified compressed columnar data 124 to query operator 118 for query processing.

In step 512, the first decoded columnar data and the second decoded columnar data are provided to a query operator. For example, decoder 116 provides a flit of decoded unified compressed columnar data 124 to query operator 118 for processing. In embodiments, decoder 116 enables parallel processing of values of the flit of decoded unified compressed columnar data 124 by providing values of the flit of decoded unified compressed columnar data 124 to a plurality of query operators 118.

Embodiments described herein may operate in various ways to load compressed columnar data into a first on-chip buffer. For instance, FIG. 6 depicts a flowchart 600 of a process for loading compressed columnar data into a first on-chip buffer, in accordance with an embodiment. Integrated circuit 102, column loader 104, on-chip buffer 106, balancer 108, column space(s) 202A-202N, RLE FIFO(s) 204A-204N, and/or Bitpack FIFO(s) 206A-206N may, for example, operate according to flowchart 600. Flowchart 600 is described as follows with respect to FIGS. 1 and 2 for illustrative purposes.

Flowchart 600 starts at step 602. In step 602, available logical space in a first on-chip buffer associated with a first column is determined to satisfy an availability condition. For example, column loader 104 determines that an available logical space in RLE FIFO(s) 204A-204N, and/or Bitpack FIFO(s) 206A-206N of on-chip buffer 106 exceeds a predetermined threshold (e.g., 32 flits, etc.), In step 604, first compressed columnar data associated with the first column is streamed into the available logical space in the first on-chip buffer associated with the first column. For example, column loader 104 burst reads compressed columnar data 120A-120N into the available logical space in RLE FIFO(s) 204A-204N, and/or Bitpack FIFO(s) 206A-206N.

Embodiments described herein may operate in various ways to process compressed columnar data from a first on-chip buffer into a second on-chip buffer in a time-shared manner. For instance, FIG. 7 depicts a flowchart 700 of a process for time-shared processing of compressed columnar data from a first on-chip buffer into a second on-chip buffer, in accordance with an embodiment. Integrated circuit 102, on-chip buffer 106, balancer 108, on-chip buffer 110, column space(s) 202A-202N, RLE FIFO(s) 204A-204N, Bitpack FIFO(s) 206A-206N, column space(s) 302A-302N, RLE FIFO(s) 304A-304N, and/or Bitpack FIFO(s) 306A-306N may, for example, operate according to flowchart 700. Note that not all steps of flowchart 700 need to be performed in all embodiments, and in some embodiments, the steps of flowchart 700 may be performed in different orders than shown. Flowchart 700 is described as follows with respect to FIGS. 1 and 3 for illustrative purposes.

Flowchart 700 starts at step 702. In step 702, a first number of credits is associated with a first column, the first number of credits determined based at least on a first compression ratio associated with first compressed columnar data of the first column and a second compression ratio associated with second compressed columnar data of a second column. For example, balancer 108 initializes columns that are in a Bitpack forwarding mode with a number of credits based on the relative compression ratios (e.g., values per flit, etc.) of the Bitpack flits associate with the column.

In step 704, a second number of credits is associated with the second column, the second number of credits determined based at least on the first compression ratio and the second compression ratio. For example, balancer 108 initializes columns that are in a Bitpack forwarding mode with a number of credits based on the relative compression ratios (e.g., values per flit, etc.) of the Bitpack flits associate with the column.

In step 706, the first number of credits is determined to be greater than the second number of credits. For example, balancer 108 selects a column with the highest number of credits for Bitpack flit forwarding.

In step 708, at least a portion of the first compressed columnar data is forwarded from the first on-chip buffer to a second on-chip buffer. For example, balancer 108 forwards a Bitpack flit associated with the selected column from Bitpack FIFO(s) 206A-206N of on-chip buffer 108 to Bitpack FIFO(s) 306A-306N of on-chip buffer 110.

In step 710, the first number of credits is decremented. For example, balancer 108 decrements the number of credits for the selected column after a Bitpack flit associated with the column is forwarded to on-chip buffer 110.

Embodiments described herein may operate in various ways to transcode compressed columnar data into unified compressed columnar data. For instance, FIG. 8 depicts a flowchart 800 of a process for transcoding compressed columnar data into unified compressed columnar data, in accordance with an embodiment. Integrated circuit 102, on-chip buffer 110, transcoder 112, on-chip buffer 114, column space(s) 302A-302N, RLE FIFO(s) 304A-304N, Bitpack FIFO(s) 306A-306N, controller 402, aligner 404, accumulation buffer(s) 406A-406N, column space(s) 408A-408N, value FIFO(s) 410A-410N and/or length FIFO(s) 412A-412N may, for example, operate according to flowchart 800. Note that not all steps of flowchart 800 need to be performed in all embodiments, and in some embodiments, the steps of flowchart 800 may be performed in different orders than shown. Flowchart 800 is described as follows with respect to FIGS. 1 and 4 for illustrative purposes.

Flowchart 800 starts at step 802. In step 802, a column is selected for transcoding during a current transcoding cycle. For example, controller 402 selects an eligible column to transcode during the clock cycle. In embodiments, a column is eligible for Bitpack transcoding if there are leftover Bitpack values to transcode in a current nonuniform block and a Bitpack flit is available for transcoding. In embodiments, a column is eligible for RLE transcoding if the column is not eligible for Bitpack transcoding and there is an RLE tuple that can be transcoded in a current RLE flit.

In step 804, a number of values is determined for transcoding during the current transcoding cycle. For example, controller 402 determines a number of RLE or Bitpack values to transcode during the current clock cycle. During RLE transcoding, controller 402 appends one RLE tuple to a unified RLE stream associated with the column. During each clock cycle, controller 402, in embodiments, appends, onto unified RLE streams 414A-414N associated with the selected column, an RLE tuple from RLE FIFO(s) 304A-304N associated with the selected column or up to a Bitpack flit of values from Bitpack FIFO(s) 306A-306N associated with the selected column.

In step 806, values associated with the selected column that are of varying lengths are normalized into normalized values that are of a fixed length that is selected from a predetermined set of fixed lengths. For example, aligner 404 process unified RLE streams 414A-414N associated with the columns by padding the RLE or Bitpack values to normalize the RLE or Bitpack values to a fixed bit width selected from a set of predetermined fixed bit widths (e.g., 8 bits, 16 bits, 32 bits, etc.).

In step 808, the normalized values are accumulated in an accumulation buffer until a predetermined number of normalized values are accumulated. For example, accumulation buffer(s) 406A-406N buffer normalized columnar data 416A-416N until the number of tuples in accumulation buffer(s) 406A-406N exceeds a unified RLE flit of a fixed size.

In step 810, the predetermined number of normalized values are loaded from the accumulation buffer into a third on-chip buffer. For example, when the number of tuples accumulated in accumulation buffer(s) 406A-406N associated with a column exceeds the fixed size of a unified RLE flit, a unified RLE flit corresponding to the column is output to value FIFO(s) 410A-410N and/or length FIFO(s) 412A-412N of on-chip buffer 114.

Embodiments described herein may operate in various ways to decode unified compressed columnar data in value-wise manner. For instance, FIG. 9 depicts a flowchart 900 of a process for value-wise decoding unified compressed columnar data, in accordance with an embodiment. Integrated circuit 102, on-chip buffer 114, and/or decoder 116 may, for example, operate according to flowchart 900. Note that not all steps of flowchart 900 may need to be performed in all embodiments, and in some embodiments, the steps of flowchart 900 may be performed in different orders than shown. Flowchart 900 is described as follows with respect to FIGS. 1 and 4 for illustrative purposes.

Flowchart 900 starts at step 902. In step 902, a value of at least one of the first unified columnar data or the second unified columnar data is determined to be a pointer to a dictionary entry. For example, decoder 116 determines that a normalized RLE or Bitpack values in unified columnar data 122 includes a pointer to a dictionary.

In step 904, a real value associated with the pointer is determined using a dictionary lookup. For example, decoder 116 performs a dictionary lookup using the pointer to determine an actual (i.e., raw) value.

In step 906, the pointer in the first unified columnar data or the second unified columnar data is replaced with the real value. For example, decoder 116 replaces the pointer with the actual value to generate decoded unified compressed columnar data 124. In embodiments, decoder 116 provides decoded unified compressed columnar data 124 to query operator 118 for query processing.

III. Example Mobile Device and Computer System Implementation

Integrated circuit 102, column loader 104, on-chip buffer 106, balancer 108, on-chip buffer 110, transcoder 112, on-chip buffer 114, decoder 116, query operator 118, column space(s) 202A-202N, RLE FIFO(s) 204A-204N, Bitpack FIFO(s) 306A-306N, column space(s) 302A-302N, RLE FIFO(s) 304A-304N, Bitpack FIFO(s) 306A-306N, controller 402, aligner 404, accumulation buffer(s) 406A-406N, column space(s) 408A-408N, Value FIFO(s) 410A-410N, Length FIFO(s) 412A-412N, and/or components described therein, and/or the steps of flowcharts 500, 600, 700, 800 and/or 900 are implemented in hardware, or hardware combined with one or both of software and/or firmware. For example, integrated circuit 102, column loader 104, on-chip buffer 106, balancer 108, on-chip buffer 110, transcoder 112, on-chip buffer 114, decoder 116, query operator 118, column space(s) 202A-202N, RLE FIFO(s) 204A-204N, Bitpack FIFO(s) 306A-306N, column space(s) 302A-302N, RLE FIFO(s) 304A-304N, Bitpack FIFO(s) 306A-306N, controller 402, aligner 404, accumulation buffer(s) 406A-406N, column space(s) 408A-408N, Value FIFO(s) 410A-410N, Length FIFO(s) 412A-412N, and/or the components described therein, and/or the steps of flowcharts 500, 600, 700, 800, and/or 900 are implemented in one or more FPGAs (field-programmable gate arrays), SoCs (system on chip), ASICs (application-specific integrated circuits). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 10:
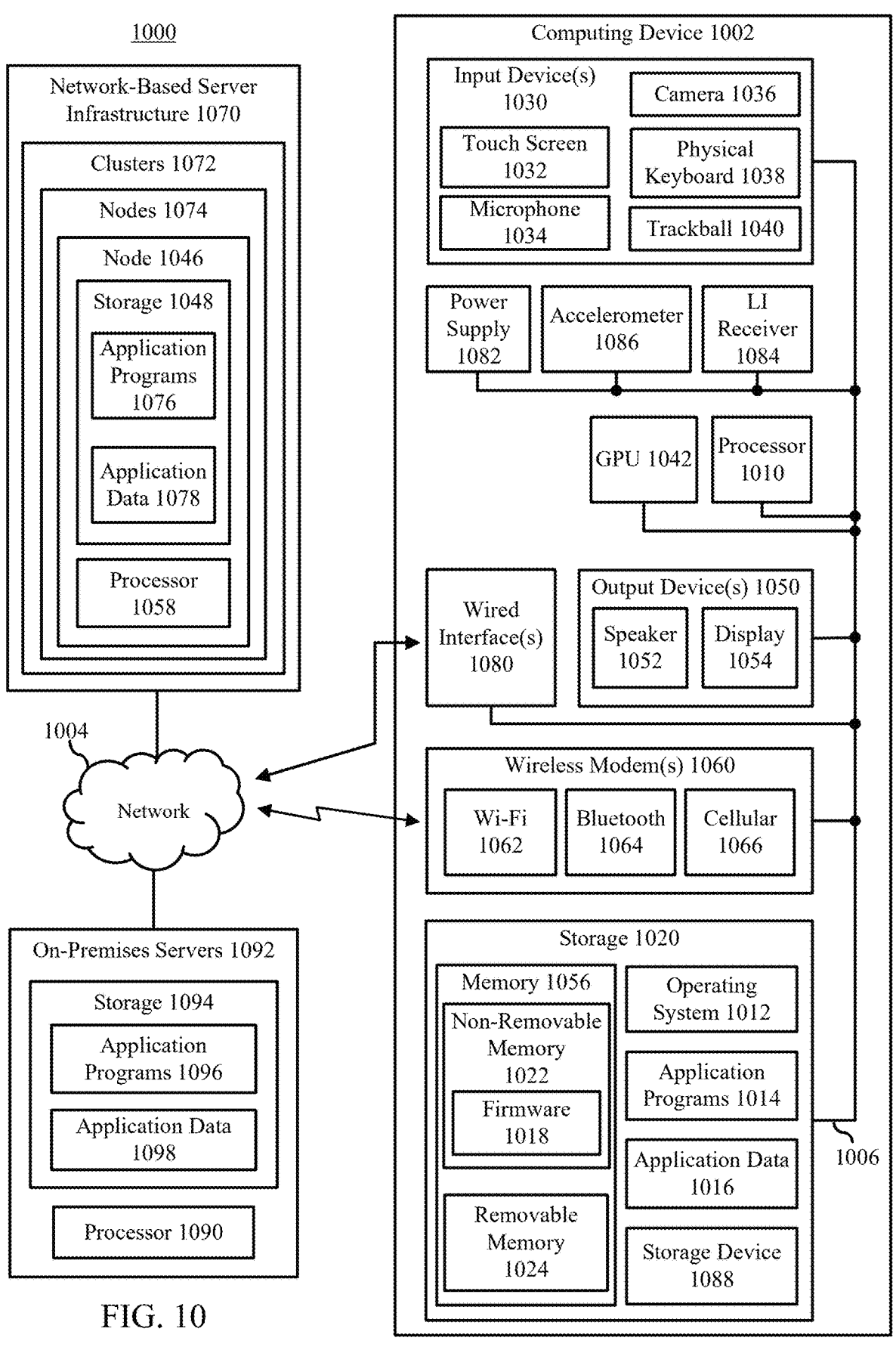
FIG. 10 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 10. FIG. 10 shows a block diagram of an exemplary computing environment 1000 that includes a computing device 1002. Computing device 1002 is an example of a device that includes integrated circuit 102. In some embodiments, computing device 1002 is communicatively coupled with devices (not shown in FIG. 10) external to computing environment 1000 via network 1004. Network 1004 comprises one or more networks such as local area networks (LANs), wide area networks (WANs), enterprise networks, the Internet, etc. In examples, network 1004 includes one or more wired and/or wireless portions. In some examples, network 1004 additionally or alternatively includes a cellular network for cellular communications. Computing device 1002 is described in detail as follows.

Computing device 1002 can be any of a variety of types of computing devices. Examples of computing device 1002 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1002 is a stationary computing device such as a desktop computer, a personal computer (PC), a stationary server device, a minicomputer, a mainframe, a supercomputer, etc.

As shown in FIG. 10, computing device 1002 includes a variety of hardware and software components, including a processor 1010, a storage 1020, a graphics processing unit (GPU) 1042, one or more input devices 1030, one or more output devices 1050, one or more wireless modems 1060, one or more wired interfaces 1080, a power supply 1082, a location information (LI) receiver 1084, and an accelerometer 1086. Storage 1020 includes memory 1056, which includes non-removable memory 1022 and removable memory 1024, and a storage device 1088. Storage 1020 also stores an operating system 1012, application programs 1014, and application data 1016. Wireless modem(s) 1060 include a Wi-Fi modem 1062, a Bluetooth modem 1064, and a cellular modem 1066. Output device(s) 1050 includes a speaker 1052 and a display 1054. Input device(s) 1030 includes a touch screen 1032, a microphone 1034, a camera 1036, a physical keyboard 1038, and a trackball 1040. Not all components of computing device 1002 shown in FIG. 10 are present in all embodiments, additional components not shown may be present, and in a particular embodiment any combination of the components are present. In examples, components of computing device 1002 are mounted to a circuit card (e.g., a motherboard) of computing device 1002, integrated in a housing of computing device 1002, or otherwise included in computing device 1002. The components of computing device 1002 are described as follows.

In embodiments, a single processor 1010 (e.g., central processing unit (CPU), microcontroller, a microprocessor, signal processor, ASIC (application specific integrated circuit), and/or other physical hardware processor circuit) or multiple processors 1010 are present in computing device 1002 for performing such tasks as program execution, signal coding, data processing, input/output processing, power control, and/or other functions. In examples, processor 1010 is a single-core or multi-core processor, and each processor core is single-threaded or multithreaded (to provide multiple threads of execution concurrently). Processor 1010 is configured to execute program code stored in a computer readable medium, such as program code of operating system 1012 and application programs 1014 stored in storage 1020. The program code is structured to cause processor 1010 to perform operations, including the processes/methods disclosed herein. Operating system 1012 controls the allocation and usage of the components of computing device 1002 and provides support for one or more application programs 1014 (also referred to as "applications" or "apps"). In examples, application programs 1014 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1010 includes one or more general processors (e.g., CPUs) configured with or coupled to one or more hardware accelerators, such as one or more NPUs 1044 and/or one or more GPUs 1042.

Any component in computing device 1002 can communicate with any other component according to function, although not all connections are shown for case of illustration. For instance, as shown in FIG. 10, bus 1006 is a multiple signal line communication medium (e.g., conductive traces in silicon, metal traces along a motherboard, wires, etc.) present to communicatively couple processor 1010 to various other components of computing device 1002, although in other embodiments, an alternative bus, further buses, and/or one or more individual signal lines is/are present to communicatively couple components. Bus 1006 represents one or more of any of several types of bus structures, including a memory bus or memory controller, a peripheral bus, an accelerated graphics port, and a processor or local bus using any of a variety of bus architectures.

Storage 1020 is physical storage that includes one or both of memory 1056 and storage device 1088, which store operating system 1012, application programs 1014, and application data 1016 according to any distribution. Non-removable memory 1022 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1022 includes main memory and is separate from or fabricated in a same integrated circuit as processor 1010. As shown in FIG. 10, non-removable memory 1022 stores firmware 1018 that is present to provide low-level control of hardware. Examples of firmware 1018 include BIOS (Basic Input/Output System, such as on personal computers) and boot firmware (e.g., on smart phones). In examples, removable memory 1024 is inserted into a receptacle of or is otherwise coupled to computing device 1002 and can be removed by a user from computing device 1002. Removable memory 1024 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1088 are present that are internal and/or external to a housing of computing device 1002 and are or are not removable. Examples of storage device 1088 include a hard disk drive, a SSD, a thumb drive (e.g., a USB (Universal Serial Bus) flash drive), or other physical storage device.

One or more programs are stored in storage 1020. Such programs include operating system 1012, one or more application programs 1014, and other program modules and program data.

Storage 1020 also stores data used and/or generated by operating system 1012 and application programs 1014 as application data 1016. Examples of application data 1016 include web pages, text, images, tables, sound files, video data, and other data. In examples, application data 1016 is sent to and/or received from one or more network servers or other devices via one or more wired or wireless networks. Storage 1020 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1002 through one or more input devices 1030 and receives information from computing device 1002 through one or more output devices 1050. Input device(s) 1030 includes one or more of touch screen 1032, microphone 1034, camera 1036, physical keyboard 1038 and/or trackball 1040 and output device(s) 1050 includes one or more of speaker 1052 and display 1054. Each of input device(s) 1030 and output device(s) 1050 are integral to computing device 1002 (e.g., built into a housing of computing device 1002) or are external to computing device 1002 (e.g., communicatively coupled wired or wirelessly to computing device 1002 via wired interface(s) 1080 and/or wireless modem(s) 1060). Further input devices 1030 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1054 displays information, as well as operating as touch screen 1032 by receiving user commands and/or other information (e.g., by touch, finger gestures, virtual keyboard, etc.) as a user interface. Any number of each type of input device(s) 1030 and output device(s) 1050 are present, including multiple microphones 1034, multiple cameras 1036, multiple speakers 1052, and/or multiple displays 1054.

In embodiments where GPU 1042 is present, GPU 1042 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1042 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

One or more wireless modems 1060 can be coupled to antenna(s) (not shown) of computing device 1002 and can support two-way communications between processor 1010 and devices external to computing device 1002 through network 1004, as would be understood to persons skilled in the relevant art(s). Wireless modem 1060 is shown generically and can include a cellular modem 1066 for communicating with one or more cellular networks, such as a GSM network for data and voice communications within a single cellular network, between cellular networks, or between the mobile device and a public switched telephone network (PSTN). In examples, wireless modem 1060 also or alternatively includes other radio-based modem types, such as a Bluetooth modem 1064 (also referred to as a "Bluetooth device") and/or Wi-Fi modem 1062 (also referred to as an "wireless adaptor"). Wi-Fi modem 1062 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1002 can further include power supply 1082, LI receiver 1084, accelerometer 1086, and/or one or more wired interfaces 1080. Example wired interfaces 1080 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1080 of computing device 1002 provide for wired connections between computing device 1002 and network 1004, or between computing device 1002 and one or more devices/peripherals when such devices/peripherals are external to computing device 1002 (e.g., a pointing device, display 1054, speaker 1052, camera 1036, physical keyboard 1038, etc.). Power supply 1082 is configured to supply power to each of the components of computing device 1002 and receives power from a battery internal to computing device 1002, and/or from a power cord plugged into a power port of computing device 1002 (e.g., a USB port, an A/C power port). LI receiver 1084 is useable for location determination of computing device 1002 and in examples includes a satellite navigation receiver such as a Global Positioning System (GPS) receiver and/or includes other type of location determiner configured to determine location of computing device 1002 based on received information (e.g., using cell tower triangulation, etc.). Accelerometer 1086, when present, is configured to determine an orientation of computing device 1002.

Note that the illustrated components of computing device 1002 are not required or all-inclusive, and fewer or greater numbers of components can be present as would be recognized by one skilled in the art. In examples, computing device 1002 includes one or more of a gyroscope, barometer, proximity sensor, ambient light sensor, digital compass, etc. In an example, processor 1010 and memory 1056 are co-located in a same semiconductor device package, such as being included together in an integrated circuit chip, FPGA, or system-on-chip (SOC), optionally along with further components of computing device 1002.

In embodiments, computing device 1002 is configured to implement any of the above-described features of flowcharts herein. Computer program logic for performing any of the operations, steps, and/or functions described herein is stored in storage 1020 and executed by processor 1010.

In some embodiments, server infrastructure 1070 is present in computing environment 1000 and is communicatively coupled with computing device 1002 via network 1004. Server infrastructure 1070, when present, is a network-accessible server set (e.g., a cloud-based environment or platform). As shown in FIG. 10, server infrastructure 1070 includes clusters 1072. Each of clusters 1072 comprises a group of one or more compute nodes and/or a group of one or more storage nodes. For example, as shown in FIG. 10, cluster 1072 includes nodes 1074. Each of nodes 1074 are accessible via network 1004 (e.g., in a "cloud-based" embodiment) to build, deploy, and manage applications and services. In examples, any of nodes 1074 is a storage node that comprises a plurality of physical storage disks, SSDs, and/or other physical storage devices that are accessible via network 1004 and are configured to store data associated with the applications and services managed by nodes 1074.

Each of nodes 1074, as a compute node, comprises one or more server computers, server systems, and/or computing devices. For instance, a node 1074 in accordance with an embodiment includes one or more of the components of computing device 1002 disclosed herein. Each of nodes 1074 is configured to execute one or more software applications (or "applications") and/or services and/or manage hardware resources (e.g., processors, memory, etc.), which are utilized by users (e.g., customers) of the network-accessible server set. In examples, as shown in FIG. 10, nodes 1074 includes a node 1046 that includes storage 1048 and/or one or more of a processor 1058 (e.g., similar to processor 1010, and/or GPU 1042 of computing device 1002). Storage 1048 stores application programs 1076 and application data 1078. Processor(s) 1058 operate application programs 1076 which access and/or generate related application data 1078. In an implementation, nodes such as node 1046 of nodes 1074 operate or comprise one or more virtual machines, with each virtual machine emulating a system architecture (e.g., an operating system), in an isolated manner, upon which applications such as application programs 1076 are executed.

In embodiments, one or more of clusters 1072 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1072 are included in a datacenter in a distributed collection of datacenters. In embodiments, exemplary computing environment 1000 comprises part of a cloud-based platform.

In an embodiment, computing device 1002 accesses application programs 1076 for execution in any manner, such as by a client application and/or a browser at computing device 1002.

In an example, for purposes of network (e.g., cloud) backup and data security, computing device 1002 additionally and/or alternatively synchronizes copies of application programs 1014 and/or application data 1016 to be stored at network-based server infrastructure 1070 as application programs 1076 and/or application data 1078. In examples, operating system 1012 and/or application programs 1014 include a file hosting service client configured to synchronize applications and/or data stored in storage 1020 at network-based server infrastructure 1070.

In some embodiments, on-premises servers 1092 are present in computing environment 1000 and are communicatively coupled with computing device 1002 via network 1004. On-premises servers 1092, when present, are hosted within an organization's infrastructure and, in many cases, physically onsite of a facility of that organization. On-premises servers 1092 are controlled, administered, and maintained by IT (Information Technology) personnel of the organization or an IT partner to the organization. Application data 1098 can be shared by on-premises servers 1092 between computing devices of the organization, including computing device 1002 (when part of an organization) through a local network of the organization, and/or through further networks accessible to the organization (including the Internet). Furthermore, in examples, on-premises servers 1092 serve applications such as application programs 1096 to the computing devices of the organization, including computing device 1002. Accordingly, in examples, on-premises servers 1092 include storage 1094 (which includes one or more physical storage devices such as storage disks and/or SSDs) for storage of application programs 1096 and application data 1098 and include a processor 1090 (e.g., similar to processor 1010, and/or GPU 1042 of computing device 1002) for execution of application programs 1096. In some embodiments, multiple processors 1090 are present for execution of application programs 1096 and/or for other purposes. In further examples, computing device 1002 is configured to synchronize copies of application programs 1014 and/or application data 1016 for backup storage at on-premises servers 1092 as application programs 1096 and/or application data 1098.

Embodiments described herein may be implemented in one or more of computing device 1002, network-based server infrastructure 1070, and on-premises servers 1092. For example, in some embodiments, computing device 1002 is used to implement systems, clients, or devices, or components/subcomponents thereof, disclosed elsewhere herein. In other embodiments, a combination of computing device 1002, network-based server infrastructure 1070, and/or on-premises servers 1092 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 1020. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1014) are stored in storage 1020. Such computer programs can also be received via wired interface(s) 1060 and/or wireless modem(s) 1060 over network 1004. Such computer programs, when executed or loaded by an application, enable computing device 1002 to implement features of embodiments discussed herein. Accordingly, such computer programs represent controllers of the computing device 1002.

Embodiments are also directed to computer program products comprising computer code or instructions stored on any computer-readable medium or computer-readable storage medium. Such computer program products include the physical storage of storage 1020 as well as further physical storage types.

IV. Additional Example Embodiments

In embodiments, an integrated circuit for line-rate processing of compressed columnar data comprises: a column loader to load first compressed columnar data associated with a first column and second compressed columnar data associated with a second column into a first on-chip buffer; a balancer to perform time-shared processing of the first compressed columnar data and the second compressed columnar data from the first on-chip buffer and load the processed first compressed columnar data and second compressed columnar data into a second on-chip buffer; a transcoder to transcode the first compressed columnar data and the second compressed columnar data from the second on-chip buffer into first unified columnar data and second unified columnar data having a unified format and load the first unified columnar data and second unified columnar data into a third on-chip buffer, wherein the first unified columnar data and the second unified columnar data in the third on-chip buffer are logically aligned; and a decoder to perform value-wise decoding of at least a portion of the first unified columnar data or the second unified columnar data from the third on-chip buffer into first decoded columnar data and second decoded columnar data and provide the first decoded columnar data and the second decoded columnar data to a query operator.

In embodiments, to load the first compressed columnar data and second compressed columnar data into the first on-chip buffer, the column loader is configured to: determine that available space in the first on-chip buffer associated with the first column satisfies an availability condition; and stream the first compressed columnar data into the available space in the first on-chip buffer associated with the first column.

In embodiments, to perform time-shared processing of the first compressed columnar data and the second compressed columnar data from the first on-chip buffer, the balancer is configured to: perform time-shared processing based at least on a first compression ratio associated with the first compressed columnar data and a second compression ratio associated with the second compressed columnar data.

In embodiments, to perform time-shared processing of the first compressed columnar data and the second compressed columnar data from the first on-chip buffer, the balancer is configured to: associate a first number of credits with the first column, the first number of credits determined based at least on a first compression ratio associated with the first compressed columnar data and a second compression ratio associated with the second compressed columnar data; associate a second number of credits with the second column, the second number of credits determined based at least on the first compression ratio and the second compression ratio; determine that the first number of credits is greater than the second number of credits; forward at least a portion of the first compressed columnar data from the first on-chip buffer to the second on-chip buffer; and decrement the first number of credits.

In embodiments, to transcode the first compressed columnar data and the second compressed columnar data, the transcoder is configured to: transcode at least one of the first compressed columnar data or the second compressed columnar data from a first format comprising values that are of varying lengths into the unified format comprising values that are of a fixed length selected from a predetermined set of fixed lengths.

In embodiments, the transcoder comprises: a controller to select a column to transcode during a current transcoding cycle, and determine a number of values to transcode during the current transcoding cycle; an aligner to normalize values associated with the selected column that are of varying lengths into normalized values that are of a fixed length selected from a predetermined set of fixed lengths; and an accumulation buffer to accumulate the normalized values until a predetermined number of normalized values are accumulated, and loading the predetermined number of normalized values into the third on-chip buffer.

In embodiments, to normalize values associated with the selected column, the aligner is configured to: pad the values that are of varying lengths until the values that are of varying lengths are of the fixed length selected from the predetermined set of fixed lengths.

In embodiments, to perform value-wise decoding of at least a portion of the first unified columnar data and the second unified columnar data, the decoder is configured to: determine that a value of at least one of the first unified columnar data or the second unified columnar data is a pointer to a dictionary entry; determine a real value associated with the pointer using a dictionary lookup; and replace the pointer in the first unified columnar data or the second unified columnar data with the real value.

In embodiments, at least one of the first compressed columnar data or the second compressed columnar data comprises at least one of: a uniform block tuple comprising a length indicating a number of rows in a uniform block of consecutive rows of the first column or the second column that share a common row value, and the common row value shared by consecutive rows of uniform block; or a nonuniform block tuple comprising length indicating a number of rows in a nonuniform block of consecutive rows of the first column or the second column that do not share a common value, and a pointer to a position in a value array comprising row values of nonuniform blocks of the first column or the second column.

In embodiments, at least one of the first on-chip buffer, the second on-chip buffer, or the third on-chip buffer comprises: a first logical buffer associated with the first column; and a second logical buffer associated with the second column, wherein the first logical buffer and the second logical buffer share on-chip memory.

In embodiments, a method for line-rate processing of compressed columnar data using an integrated circuit comprises: loading first compressed columnar data associated with a first column and second compressed columnar data associated with a second column into a first on-chip buffer; performing time-shared processing of the first compressed columnar data and the second compressed columnar data from the first on-chip buffer into a second on-chip buffer; transcoding the first compressed columnar data and the second compressed columnar data from the second on-chip buffer into first unified columnar data and second unified columnar data having a unified format; loading the first unified columnar data and the second unified columnar data into a third on-chip buffer, wherein the first unified columnar data and the second unified columnar data in the third on-chip buffer are logically aligned; and providing at least a first portion of the first unified columnar data or the second unified columnar data to a query operator.

In embodiments, loading first compressed columnar data associated with a first column and second compressed columnar data associated with a second column into a first on-chip buffer comprises: determining that available space in the first on-chip buffer associated with the first column satisfies an availability condition; and streaming the first compressed columnar data into the available space in the first on-chip buffer associated with the first column.

In embodiments, performing time-shared processing of the first compressed columnar data and the second compressed columnar data from the first on-chip buffer and load the processed first compressed columnar data and second compressed columnar data into a second on-chip buffer comprises: performing time-shared processing based at least on a first compression ratio associated with the first compressed columnar data and a second compression ratio associated with the second compressed columnar data.

In embodiments, performing time-shared processing of the first compressed columnar data and the second compressed columnar data from the first on-chip buffer and load the processed first compressed columnar data and second compressed columnar data into a second on-chip buffer comprises: associating a first number of credits with the first column, the first number of credits determined based at least on a first compression ratio associated with the first compressed columnar data and a second compression ratio associated with the second compressed columnar data; associating a second number of credits with the second column, the second number of credits determined based at least on the first compression ratio and the second compression ratio; determining that the first number of credits is greater than the second number of credits; forwarding at least a portion of the first compressed columnar data from the first on-chip buffer to the second on-chip buffer; and decrementing the first number of credits.

In embodiments, transcoding the first compressed columnar data and the second compressed columnar data from the second on-chip buffer into first unified columnar data and second unified columnar data having a unified format comprises: transcoding at least one of the first compressed columnar data or the second compressed columnar data from a first format comprising values that are of varying lengths into the unified format comprising values that are of a fixed length selected from a predetermined set of fixed lengths.

In embodiments, transcoding the first compressed columnar data and the second compressed columnar data from the second on-chip buffer into first unified columnar data and second unified columnar data having a unified format comprises: selecting a column to transcode during a current transcoding cycle; determining a number of values to transcode during the current transcoding cycle; normalizing values associated with the selected column that are of varying lengths into normalized values that are of a fixed length selected from a predetermined set of fixed lengths; accumulating the normalized values in an accumulation buffer until a predetermined number of normalized values are accumulated; and loading the predetermined number of normalized values into the third on-chip buffer.

In embodiments, normalizing values associated with the selected column that are of varying lengths into normalized values that are of a fixed length selected from a predetermined set of fixed lengths comprises: padding the values that are of varying lengths until the values that are of varying lengths are of the fixed length selected from the predetermined set of fixed lengths.

In embodiments, the method further comprises: performing value-wise decoding of at least a second portion of the first unified columnar data or the second unified columnar data into first decoded columnar data or second decoded columnar data; and providing the first decoded columnar data or the second decoded columnar data to the query operator.

In embodiments, performing value-wise decoding of at least a second portion of the first unified columnar data or the second unified columnar data into first decoded columnar data or second decoded columnar data comprises: determining that a value of at least one of the first unified columnar data or the second unified columnar data is a pointer to a dictionary entry; determining a real value associated with the pointer using a dictionary lookup; and replacing the pointer in the first unified columnar data or the second unified columnar data with the real value.

In embodiments, at least one of the first compressed columnar data or the second compressed columnar data comprises at least one of: a uniform block tuple comprising a length indicating a number of rows in a uniform block of consecutive rows of the first column or the second column that share a common row value, and the common row value shared by consecutive rows of uniform block; or a nonuniform block tuple comprising length indicating a number of rows in a nonuniform block of consecutive rows of the first column or the second column that do not share a common value, and a pointer to a position in a value array comprising row values of nonuniform blocks of the first column or the second column.

V. CONCLUSION

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. An integrated circuit for line-rate processing of compressed columnar data, the integrated circuit comprising:
   a column loader to load first compressed columnar data associated with a first column and second compressed columnar data associated with a second column into a first on-chip buffer;
   a balancer to perform time-shared processing of the first compressed columnar data and the second compressed columnar data from the first on-chip buffer and load the processed first compressed columnar data and second compressed columnar data into a second on-chip buffer;
   a transcoder to transcode the first compressed columnar data and the second compressed columnar data from the second on-chip buffer into first unified columnar data and second unified columnar data having a unified format and load the first unified columnar data and second unified columnar data into a third on-chip buffer, wherein the first unified columnar data and the second unified columnar data in the third on-chip buffer are logically aligned; and
   a decoder to perform value-wise decoding of at least a portion of the first unified columnar data or the second unified columnar data from the third on-chip buffer into first decoded columnar data and second decoded columnar data and provide the first decoded columnar data and the second decoded columnar data to a query operator,
   wherein at least one of the first compressed columnar data or the second compressed columnar data comprises at least one of:
      a uniform block tuple comprising a length indicating a number of rows in a uniform block of consecutive rows of the first column or the second column that share a common row value, and the common row value shared by consecutive rows of uniform block; or
      a nonuniform block tuple comprising length indicating a number of rows in a nonuniform block of consecutive rows of the first column or the second column that do not share a common value, and a pointer to a position in a value array comprising row values of nonuniform blocks of the first column or the second column.

2. The integrated circuit of claim 1, wherein, to load the first compressed columnar data and second compressed columnar data into the first on-chip buffer, the column loader is configured to:
   determine that available space in the first on-chip buffer associated with the first column satisfies an availability condition; and
   stream the first compressed columnar data into the available space in the first on-chip buffer associated with the first column.

3. The integrated circuit of claim 1, wherein, to perform time-shared processing of the first compressed columnar data and the second compressed columnar data from the first on-chip buffer, the balancer is configured to:
   perform time-shared processing based at least on a first compression ratio associated with the first compressed columnar data and a second compression ratio associated with the second compressed columnar data.

4. The integrated circuit of claim 1, wherein, to perform time-shared processing of the first compressed columnar data and the second compressed columnar data from the first on-chip buffer, the balancer is configured to:
   associate a first number of credits with the first column, the first number of credits determined based at least on a first compression ratio associated with the first compressed columnar data and a second compression ratio associated with the second compressed columnar data;
   associate a second number of credits with the second column, the second number of credits determined based at least on the first compression ratio and the second compression ratio;
   determine that the first number of credits is greater than the second number of credits;
   forward at least a portion of the first compressed columnar data from the first on-chip buffer to the second on-chip buffer; and
   decrement the first number of credits.

5. The integrated circuit of claim 1, wherein, to transcode the first compressed columnar data and the second compressed columnar data, the transcoder is configured to:

transcode at least one of the first compressed columnar data or the second compressed columnar data from a first format comprising values that are of varying lengths into the unified format comprising values that are of a fixed length selected from a predetermined set of fixed lengths.

6. The integrated circuit of claim 1, wherein the transcoder comprises:

a controller to select a column to transcode during a current transcoding cycle, and determine a number of values to transcode during the current transcoding cycle;

an aligner to normalize values associated with the selected column that are of varying lengths into normalized values that are of a fixed length selected from a predetermined set of fixed lengths; and an accumulation buffer to accumulate the normalized values until a predetermined number of normalized values are accumulated, and loading the predetermined number of normalized values into the third on-chip buffer.

7. The integrated circuit of claim 6, wherein, to normalize values associated with the selected column, the aligner is configured to:

pad the values that are of varying lengths until the values that are of varying lengths are of the fixed length selected from the predetermined set of fixed lengths.

8. The integrated circuit of claim 1, wherein, to perform value-wise decoding of at least a portion of the first unified columnar data and the second unified columnar data, the decoder is configured to:

determine that a value of at least one of the first unified columnar data or the second unified columnar data is a pointer to a dictionary entry;

determine a real value associated with the pointer using a dictionary lookup; and replace the pointer in the first unified columnar data or the second unified columnar data with the real value.

9. The integrated circuit of claim 1, wherein the decoder is configured to provide at least the portion of the first unified columnar data or the second unified columnar data to the query operator without converting the first compressed columnar data or the second compressed columnar data into raw uncompressed columnar data.

10. The integrated circuit of claim 1, wherein at least one of the first on-chip buffer, the second on-chip buffer, or the third on-chip buffer comprises:

a first logical buffer associated with the first column; and a second logical buffer associated with the second column, wherein the first logical buffer and the second logical buffer share on-chip memory.

11. A method for line-rate processing of compressed columnar data using an integrated circuit, the method comprising:

loading first compressed columnar data associated with a first column and second compressed columnar data associated with a second column into a first on-chip buffer;

performing time-shared processing of the first compressed columnar data and the second compressed columnar data from the first on-chip buffer into a second on-chip buffer;

transcoding the first compressed columnar data and the second compressed columnar data from the second on-chip buffer into first unified columnar data and second unified columnar data having a unified format;

loading the first unified columnar data and the second unified columnar data into a third on-chip buffer, wherein the first unified columnar data and the second unified columnar data in the third on-chip buffer are logically aligned; and providing at least a first portion of the first unified columnar data or the second unified columnar data to a query operator, wherein at least one of the first compressed columnar data or the second compressed columnar data comprises at least one of:

a uniform block tuple comprising a length indicating a number of rows in a uniform block of consecutive rows of the first column or the second column that share a common row value, and the common row value shared by consecutive rows of uniform block; or a nonuniform block tuple comprising length indicating a number of rows in a nonuniform block of consecutive rows of the first column or the second column that do not share a common value, and a pointer to a position in a value array comprising row values of nonuniform blocks of the first column or the second column.

12. The method of claim 11, wherein said loading first compressed columnar data associated with a first column and second compressed columnar data associated with a second column into a first on-chip buffer comprises:

determining that available space in the first on-chip buffer associated with the first column satisfies an availability condition; and streaming the first compressed columnar data into the available space in the first on-chip buffer associated with the first column.

13. The method of claim 11, wherein said performing time-shared processing of the first compressed columnar data and the second compressed columnar data from the first on-chip buffer and load the processed first compressed columnar data and second compressed columnar data into a second on-chip buffer comprises:

performing time-shared processing based at least on a first compression ratio associated with the first compressed columnar data and a second compression ratio associated with the second compressed columnar data.

14. The method of claim 11, wherein said performing time-shared processing of the first compressed columnar data and the second compressed columnar data from the first on-chip buffer and load the processed first compressed columnar data and second compressed columnar data into a second on-chip buffer comprises:

associating a first number of credits with the first column, the first number of credits determined based at least on a first compression ratio associated with the first compressed columnar data and a second compression ratio associated with the second compressed columnar data;

associating a second number of credits with the second column, the second number of credits determined based at least on the first compression ratio and the second compression ratio;

determining that the first number of credits is greater than the second number of credits;

forwarding at least a portion of the first compressed columnar data from the first on-chip buffer to the second on-chip buffer; and decrementing the first number of credits.

15. The method of claim 11, wherein said transcoding the first compressed columnar data and the second compressed columnar data from the second on-chip buffer into first unified columnar data and second unified columnar data having a unified format comprises:

transcoding at least one of the first compressed columnar data or the second compressed columnar data from a first format comprising values that are of varying lengths into the unified format comprising values that are of a fixed length selected from a predetermined set of fixed lengths.

16. The method of claim 11, wherein said transcoding the first compressed columnar data and the second compressed columnar data from the second on-chip buffer into first unified columnar data and second unified columnar data having a unified format comprises:

selecting a column to transcode during a current transcoding cycle;

determining a number of values to transcode during the current transcoding cycle;

normalizing values associated with the selected column that are of varying lengths into normalized values that are of a fixed length selected from a predetermined set of fixed lengths;

accumulating the normalized values in an accumulation buffer until a predetermined number of normalized values are accumulated; and loading the predetermined number of normalized values into the third on-chip buffer.

17. The method of claim 16, wherein said normalizing values associated with the selected column that are of varying lengths into normalized values that are of a fixed length selected from a predetermined set of fixed lengths comprises:

padding the values that are of varying lengths until the values that are of varying lengths are of the fixed length selected from the predetermined set of fixed lengths.

18. The method of claim 11, further comprising:

performing value-wise decoding of at least a second portion of the first unified columnar data or the second unified columnar data into first decoded columnar data or second decoded columnar data; and providing the first decoded columnar data or the second decoded columnar data to the query operator.

19. The method of claim 11, wherein said performing value-wise decoding of at least a second portion of the first unified columnar data or the second unified columnar data into first decoded columnar data or second decoded columnar data comprises:

determining that a value of at least one of the first unified columnar data or the second unified columnar data is a pointer to a dictionary entry;

determining a real value associated with the pointer using a dictionary lookup; and replacing the pointer in the first unified columnar data or the second unified columnar data with the real value.

20. The method of claim 11, wherein said provide at least the portion of the first unified columnar data or the second unified columnar data to the query operator comprises:

providing at least the portion of the first unified columnar data or the second unified columnar data to the query operator without converting the first compressed columnar data or the second compressed columnar data into raw uncompressed columnar data.

* * * * *